(12) United States Patent  
Ueda et al.

(10) Patent No.: US 8,941,871 B2  
(45) Date of Patent: Jan. 27, 2015

(54) IMAGE READING SYSTEM, INFORMATION PROCESSING APPARATUS, IMAGE READING APPARATUS AND COMPUTER READABLE MEDIUM

(71) Applicant: PFU Limited, Kahoku-shi, Ishikawa (JP)

(72) Inventors: Miho Ueda, Kahoku (JP); Naoki Asada, Kahoku (JP); Tomonori Yuasa, Kahoku (JP)

(73) Assignee: PFU Limited, Kahoku-shi (JP)

( * ) Notice: Subject to any disclaimer, the term of this patent is extended or adjusted under 35 U.S.C. 154(b) by 39 days.

(21) Appl. No.: 13/936,748

(22) Filed: Jul. 8, 2013

(65) Prior Publication Data

US 2014/0085667 A1 Mar. 27, 2014

(30) Foreign Application Priority Data

Sep. 27, 2012 (JP) .................. 2012-214800

(51) Int. Cl.
*G06F 3/12* (2006.01)
*H04L 1/00* (2006.01)
*H04N 1/333* (2006.01)
*H04N 1/00* (2006.01)

(52) U.S. Cl.
CPC .......... *H04N 1/00103* (2013.01); *G06F 3/1293* (2013.01); *H04L 1/00* (2013.01); *H04N 1/00225* (2013.01); *H04N 1/00477* (2013.01); *H04N 1/33323* (2013.01); *H04N 1/33361* (2013.01); *H04L 1/0007* (2013.01); *H04N 2201/0015* (2013.01); *H04N 2201/0039* (2013.01); *H04N 2201/0055* (2013.01); *H04N 2201/0072* (2013.01); *H04N 2201/0081* (2013.01); *H04N 2201/33342* (2013.01)
USPC .......................................... 358/1.15; 358/1.6

(58) Field of Classification Search
CPC .......... H04N 1/33361; H04N 1/00103; H04N 2201/0072; H04N 2201/33342
See application file for complete search history.

(56) References Cited

U.S. PATENT DOCUMENTS

2012/0206775 A1* 8/2012 Sung et al. .................... 358/442
2013/0250324 A1* 9/2013 Tse .............................. 358/1.13

FOREIGN PATENT DOCUMENTS

JP 2009-117969 5/2009

* cited by examiner

*Primary Examiner* — Dov Popovici
(74) *Attorney, Agent, or Firm* — Christie, Parker & Hale, LLP

(57) ABSTRACT

An image reading system includes an information processing apparatus, an image reading apparatus, and a wireless network. The information processing apparatus includes a wireless state detector for detecting a first wireless state between the information processing apparatus and an access point in the wireless network, a wireless state information receiver for receiving, from the image reading apparatus, information of a second wireless state between the image reading apparatus and the access point in the wireless network, a packet length determining module for determining a packet length such that the packet length in forwarding image data obtained by the image reading apparatus to the information processing apparatus via the wireless network is reduced according to degradation in either the first wireless state or the second wireless state, and a packet length information transmitter for transmitting, to the image reading apparatus, packet length information corresponding to determined packet length.

11 Claims, 26 Drawing Sheets

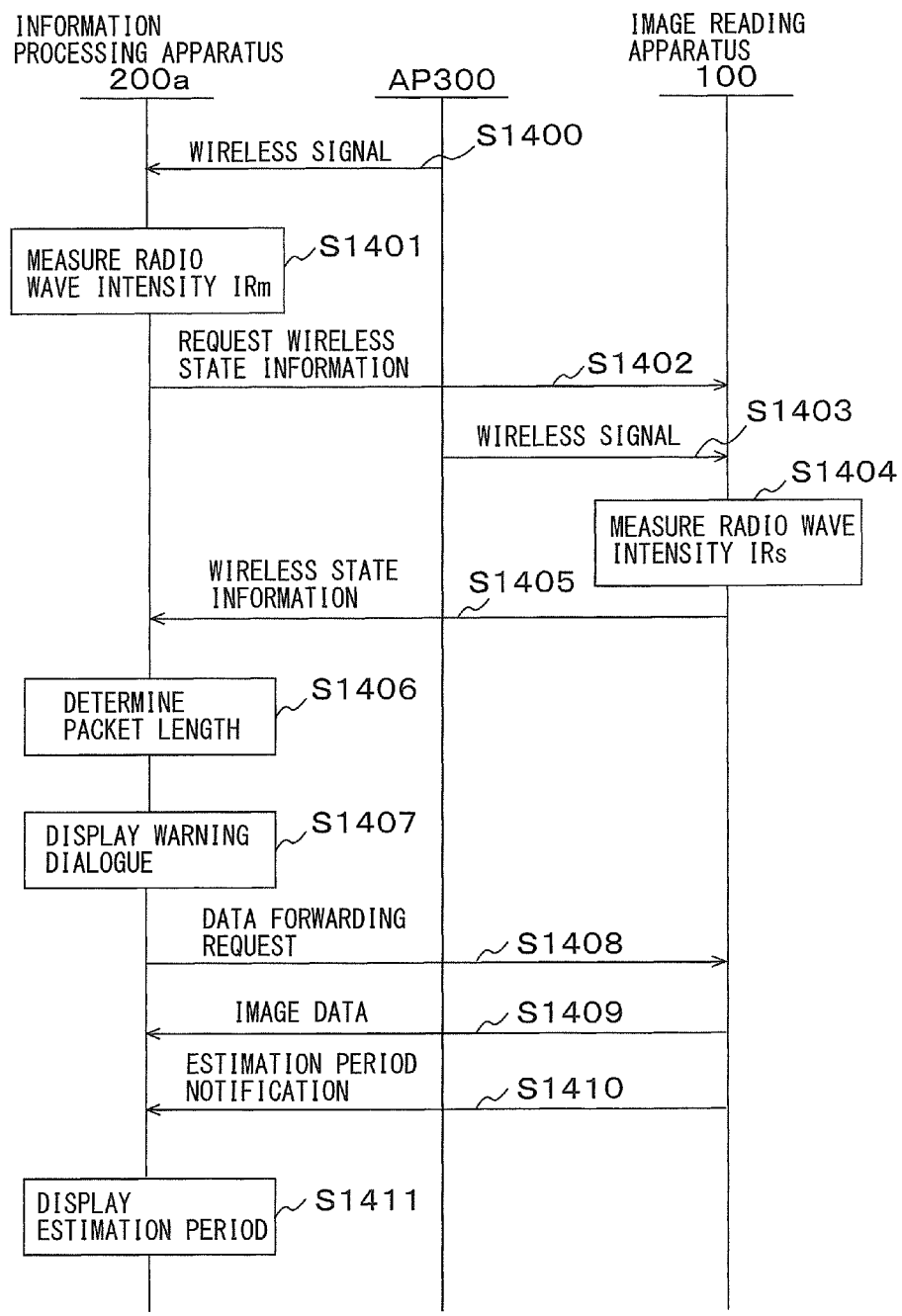

IMAGE READING SYSTEM, INFORMATION PROCESSING APPARATUS, IMAGE READING APPARATUS AND COMPUTER READABLE MEDIUM

CROSS-REFERENCE TO RELATED APPLICATIONS

This application is based upon and claims the benefit of priority of prior Japanese Patent Application No. 2012-214800, filed on Sep. 27, 2012, the entire contents of which are incorporated herein by reference.

FIELD

Embodiments illustrated herein relate to an image reading system, an information processing apparatus, an image reading apparatus, and a computer program. In particular, embodiments illustrated herein relate to control of an image reading operation when an image reading apparatus is connected to an information processing apparatus via a wireless network.

BACKGROUND

A known image reading apparatus reads a document to output image data thereof. Conventionally, an image reading apparatus is connected to a personal computer or the like by a cable, when the image reading apparatus is used. Recently, an image reading apparatus having a function of forwarding image data to a portable terminal apparatus via a wireless network has been manufactured.

As the related art, there is a known image processing system constituted by an information terminal apparatus, and an image processing apparatus that transmits data to the information terminal apparatus, receives data from the information terminal apparatus, and performs printing and scanning. The image processing apparatus includes an interface unit that uses wireless communication to transmit data to the information terminal apparatus and receive data from the information terminal apparatus, an image data generating unit that reads a document to generate the read data, and a data compressing unit that compresses the read data. The number of compressing methods performed by the data compressing unit is at least one. As a communicating condition becomes worse, the data compressing unit performs a compressing process at a higher compressing rate to reduce a data size.

Related art is disclosed in Japanese Laid-open Patent Publication No. 2009-117969.

SUMMARY

When an image reading apparatus forwards image data via a wireless network to an information processing apparatus, the following problems exist.

(1) Quality of communication between the information processing apparatus and the wireless network tends to fluctuate in accordance with a position of the information processing apparatus. For this reason, image data may not always be able to be forwarded to the information processing apparatus with good communication quality. Accordingly, it is preferable to reduce delay of data forwarding when quality of wireless communication between the image reading apparatus and the information processing apparatus becomes worse.

(2) A user who is receiving image data from the image reading apparatus is not always beside the image reading apparatus. For this reason, when a plurality of users use the same image reading apparatus, for a user other than a user who is currently uses the image reading apparatus, it is difficult to recognize whether or not the image reading apparatus is being used. Accordingly, it is preferable that a plurality of users sharing the image reading apparatus are informed of a state of the image reading apparatus in a more easily recognizable manner.

An apparatus, a system and a computer readable medium disclosed in the present specification is intended to solve at least one of the above-described problems.

In accordance with an aspect of the embodiment, there is provided an image reading system including an information processing apparatus; and an image reading apparatus communicating with the information processing apparatus via a wireless network. The information processing apparatus includes a wireless state detector for detecting a first wireless state between the information processing apparatus and an access point in the wireless network, a wireless state information receiver for receiving, from the image reading apparatus, information of a second wireless state between the image reading apparatus and the access point in the wireless network, a packet length determining module for determining a packet length such that the packet length in forwarding image data obtained by reading a document by the image reading apparatus to the information processing apparatus via the wireless network is reduced according to degradation in either one of the first wireless state and the second wireless state, and a packet length information transmitter for transmitting, to the image reading apparatus, packet length information corresponding to determined packet length.

In accordance with another aspect of the embodiment, there is provided an information processing apparatus comprising a wireless state detector for detecting a first wireless state between the information processing apparatus and an access point in a wireless network, a wireless state information receiver for receiving, from an image reading apparatus, information of a second wireless state between the image reading apparatus and the access point in the wireless network, a packet length determining module for determining a packet length such that the packet length in forwarding image data obtained by reading a document by the image reading apparatus to the information processing apparatus via the wireless network is reduced according to degradation in either one of the first wireless state and the second wireless state, and a packet length information transmitter for transmitting, to the image reading apparatus, packet length information corresponding to determined packet length.

In accordance with another aspect of the embodiment, there is provided an image reading apparatus including a reader for reading a document to generate image data, a wireless state detector for detecting a wireless state between the image reading apparatus and an access point in a wireless network, a wireless state information transmitter for transmitting information of the wireless state to an information processing apparatus, a packet length information receiver for receiving, from the information processing apparatus, packet length information of a packet length determined by the information processing apparatus in accordance with the wireless state in forwarding image data to the information processing apparatus via the wireless network, and an image data transmitter for storing the image data in the packets with the packet length corresponding to the packet length information and transmitting the packets to the information processing apparatus via the wireless network.

In accordance with another aspect of the embodiment, there is provided a computer-readable, non-transitory medium storing a computer program for causing a computer to execute a process. The process comprises detecting a first wireless state between the computer and an access point in a wireless network, receiving, from an image reading apparatus, information of a second wireless state between an image reading apparatus and the access point in the wireless network, determining a packet length such that the packet length in forwarding image data obtained by reading a document by the image reading apparatus to the computer via the wireless network is reduced according to degradation in either the first wireless state or the second wireless state, and transmitting, to the image reading apparatus, packet length information corresponding to determined packet length.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 illustrates one example of a functional configuration of the information processing apparatus 200a.

FIG. 15 is a flowchart indicating an example of an entire process performed by the information processing apparatus 200a.

FIG. 17 is a flowchart indicating an example of a connecting process performed by the information processing apparatus 200a.

FIG. 22 is a flowchart indicating an example of a packet length determining process by the information processing apparatus 200a.

FIG. 25 is a flowchart indicating an example of an image data receiving process by the information processing apparatus 200a.

FIG. 27 illustrates an example of a signal sequence at the time of forwarding image data.

DESCRIPTION OF EMBODIMENTS

Figure 1:
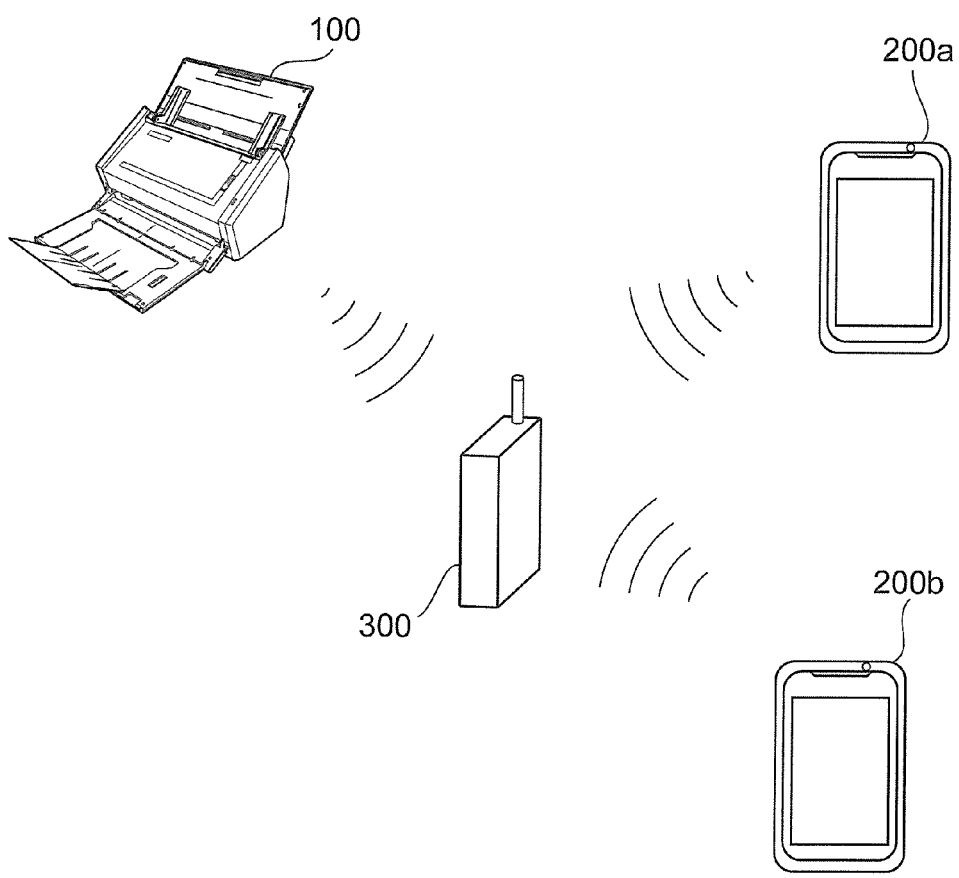
FIG. 1 illustrates a configuration of one example of an image processing system according to an embodiment.

In the following, an image processing system according to one aspect of the embodiment are described with reference to the drawings. FIG. 1 illustrates a configuration of one example of the image processing system according to an embodiment. However, the technical scope of the present invention is not limited to the embodiments, but covers the invention described in the claims, etc.

The image processing system 1 includes the image reading apparatus 100, information processing apparatuses 200a and 200b that can be connected to the image reading apparatus 100 via a wireless network, an access point 300 that functions as a network switch. The image reading apparatus 100 is an image scanner, for example. The information processing apparatuses 200a and 200b are personal digital assistances, for example. In the following descriptions and the attached drawings, the information processing apparatuses 200a and 200b may be collectively described as an "information processing apparatus 200." The access point may be described as an "AP."

Figure 2:
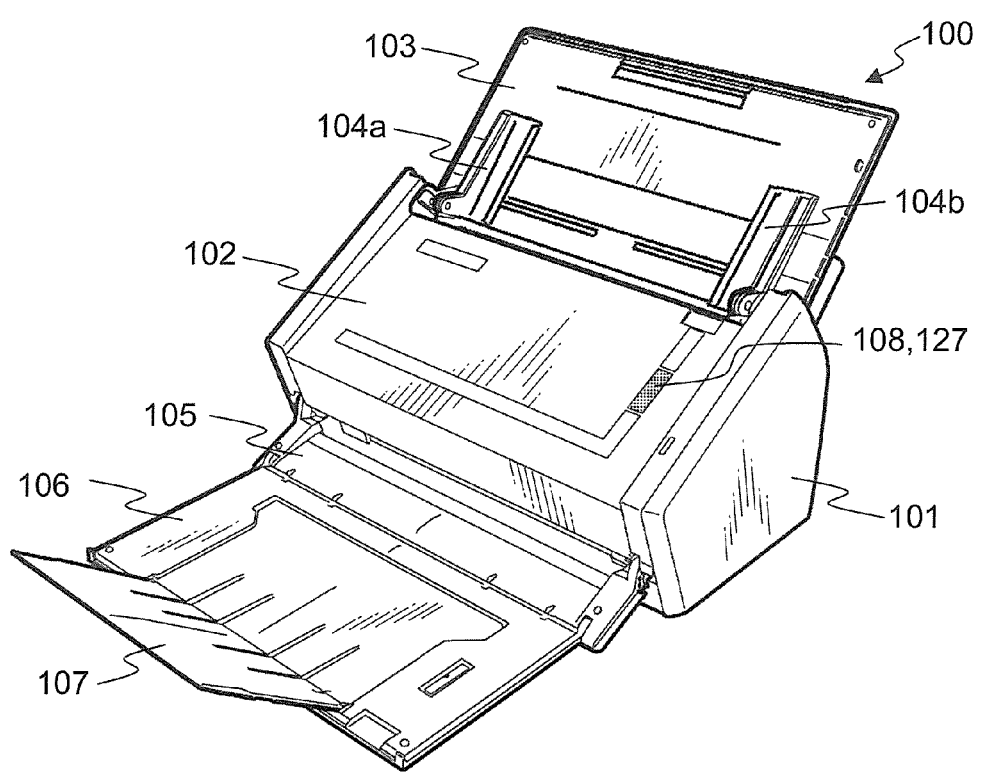
FIG. 2 is a perspective view of the image reading apparatus 100 according to an embodiment.

FIG. 2 is a perspective view of the image reading apparatus 100 according to an embodiment. The image reading apparatus 100 includes such as a casing body 101, an upper surface unit 102, a document holder 103, a front surface cover 105, an upper surface cover 106, an auxiliary cover 107, an operation button 108, and an informing unit 127.

The casing body 101 forms an outer shape of the image reading apparatus 100, together with the upper surface unit 102, the document holder 103, the front surface cover 105, the upper surface cover 106, and the auxiliary cover 107. The upper surface unit 102 is positioned so as to cover an upper surface of the image reading apparatus 100. The upper surface unit 102 is engaged to the casing body 101 by means of a hinge such that the upper surface unit 102 can be opened and closed for a certain purpose such as cleaning of an inside of the image reading apparatus 100 when a document jam occurs.

The document holder 103 is rotatably engaged to the casing body 101 by means of a hinge. When the image reading apparatus 100 is not used, the document holder 103 is positioned so as to cover the upper surface unit 102, the upper cover 106 and the auxiliary cover 107, thus functioning as an exterior cover. Meanwhile, when the image reading apparatus 100 is used as illustrated in FIG. 2, the document holder 103 is spread out such that a document can be placed on the document holder 103. Provided on the document holder 103 are document guides 104a and 104b that can slide in right and left directions with respect to a conveyance direction of a document.

The front surface cover 105 is rotatably engaged to the casing body 101 by means of a hinge. One end side of the upper surface cover 106 is connected to the front surface cover 105, and the other end side of the upper surface cover 106 is connected to the auxiliary cover 107. When necessary, the auxiliary cover 107 is spread out from the upper surface cover 106 to hold a document.

The operation button 108 is arranged in a surface of the upper surface unit 102. Pressing down the operation button 108 causes an operation detection signal to be output. The informing unit 127 makes notification to a user by an audio output or a display. The informing unit 127 includes at least a speaker, a lamp such as a light emitting diode (LED), and a displaying device such as a crystal liquid display. In the present embodiment, the operation button 108 includes a speaker and an LED lamp to function as the informing unit 127.

Figure 3:
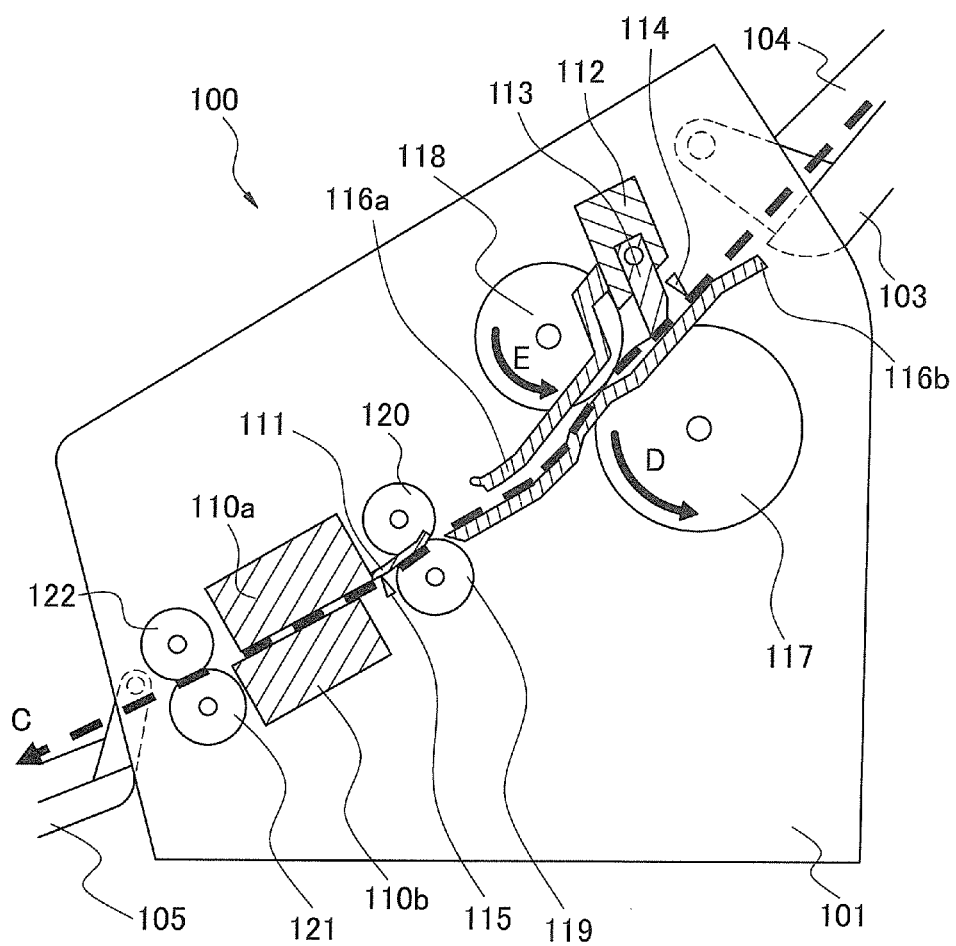
FIG. 3 illustrates a conveyance path of a document in the image reading apparatus 100.

FIG. 3 illustrates a conveyance path of a document in the image reading apparatus 100. In FIG. 3, the arrow C indicates the conveyance path of a document. The image reading apparatus 100 includes a first imaging unit 110a, a second imaging unit 110b, a set guide 112, a flap 113, a first document detecting unit 114, a second document detecting unit 115, an upper guide 116a, and a lower guide 116b. The image reading apparatus 100 further includes a paper feed roller 117, a retard roller 118, a first conveyance roller 119, a first driven roller 120, a second conveyance roller 121, a second driven roller 122, and the like.

The first imaging unit 110a includes an imaging sensor provided with imaging devices constituted by complimentary metal oxide semiconductors (CMOSs). The first imaging unit 110a reads information of a rear surface of a document to generate an image signal. Similarly, the second imaging unit 110b includes an imaging sensor provided with imaging devices constituted by CMOSs. The second imaging unit 110b reads information of a front surface of a document to generate an image signal. The first imaging unit 110a includes an imaging unit guide 111 for guiding a document to a position between the first imaging unit 110a and the second imaging unit 110b.

Only one of the first imaging unit 110a or the second imaging unit 110b may be arranged to read only one surface of a document. Instead of the imaging devices constituted by the CMOSs, an imaging devices constituted by charge coupled devices (CCDs) may be used. In the following description and the attached drawing, the first imaging unit 110a and the second imaging unit 110b may be collectively described as an "imaging unit 110."

The set guide 112 includes the flap 113 that contacts with a leading end of a document placed on the document holder 103. The first document detecting unit 114 includes a sensor arranged upstream of the set guide 112. The first document detecting unit 114 detects whether or not a document is placed on the document holder 103. The first document detecting unit 114 outputs a first document detection signal of which signal value differs between a state where a document is placed on the document holder 103 and a state where a document is not placed on the document holder 103.

The second document detecting unit 115 includes a sensor arranged upstream of the imaging unit 110. The second document detecting unit 115 detects whether or not a document exists just before the imaging unit 110. The second document detecting unit 115 outputs a second document detection signal of which signal value differs between a state where a document exists just before the imaging unit 110 and a state where a document does not exist just before the imaging unit 110.

A document to be conveyed is first placed on the document holder 103. A leading end of the document hits the flap 113 of the set guide 112, and is held by the flap 113. At this time, the flap 113 is fixed by locking means, not illustrated in the drawing. When conveyance is started, fixing of the flap 113 by the locking means is released, so that the flap 113 becomes able to swing. When the flap 113 becomes able to swing, a weight of the document causes the document moves to a position where the document contacts with the paper feed roller 117.

Rotation of the paper feed roller 117 in the direction of the arrow D causes the document to be sent to a position between the upper guide 116a and the lower guide 116b. The retard roller 118 also rotates in the direction of the arrow E. Accordingly, when a plurality of documents are placed on the document holder 103, conveyance of the documents other than the document that contacts with the paper feed roller 117 is restricted. Thereby, multiple feed of the documents can be prevented.

The document is conveyed to a position between the first imaging unit 110a and the second imaging unit 110b by the first conveyance roller 119 and the first driven roller 120 while the document is guided by the imaging unit guide 111. The document that has been read by the imaging unit 110 is discharged to a position on the front surface cover 105, the upper surface cover 106, and the auxiliary cover 107 by the second conveyance roller 121 and the second driven roller 122.

Figure 4:
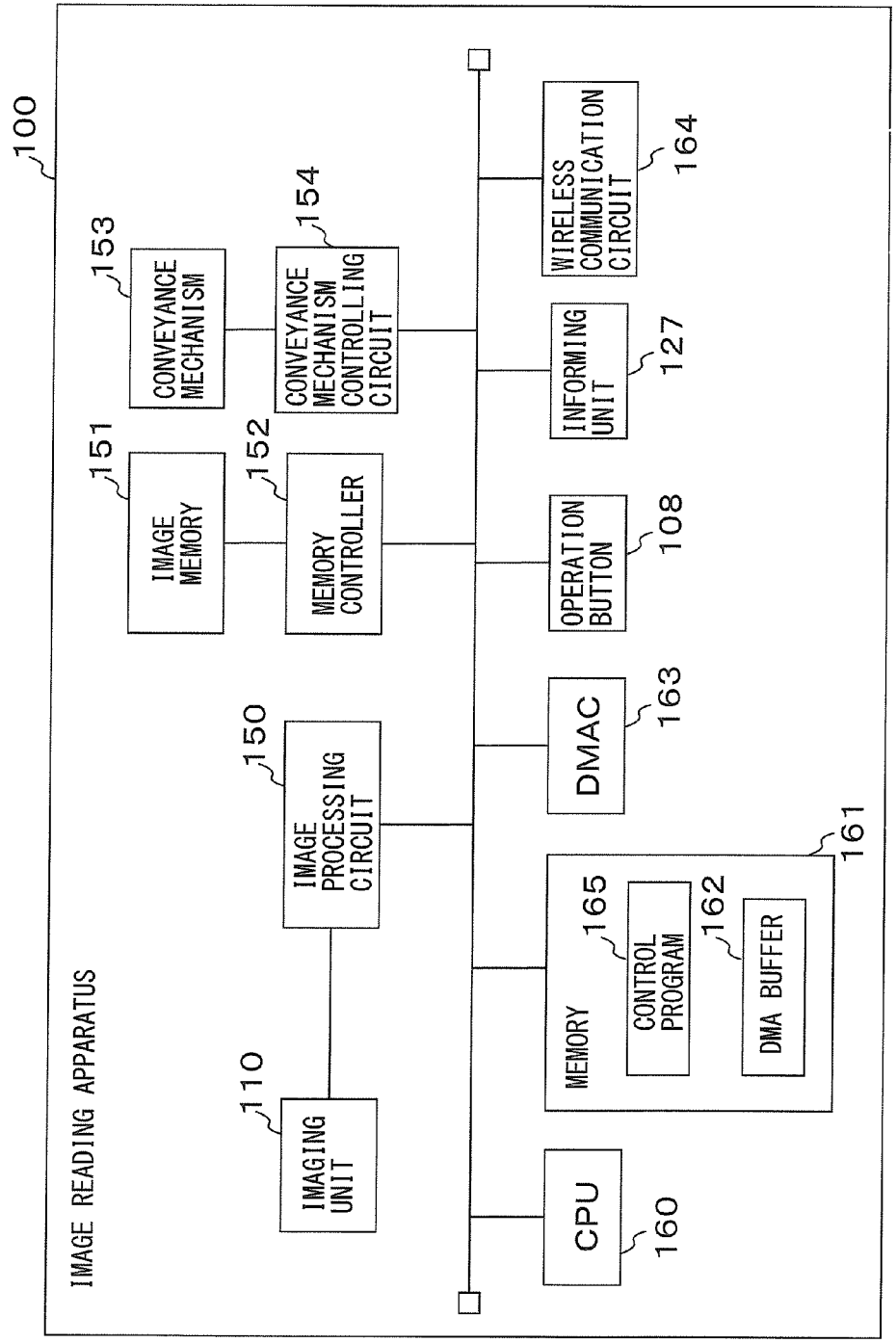
FIG. 4 illustrates one example of a hardware configuration of the image reading apparatus 100.

FIG. 4 illustrates one example of a hardware configuration of the image reading apparatus 100. The image reading apparatus 100 includes an image processing circuit 150, an image memory 151, a memory controller 152, a conveyance mechanism 153, and a conveyance mechanism controlling circuit 154. The image reading apparatus 100 further includes a central processing unit (CPU) 160, a memory 161, a direct memory access (DMA) buffer 162, a direct memory access controller (DMAC) 163, and a wireless communication circuit 164. In the following descriptions and the attached drawings, the direct memory access controller may be described as the DMAC.

The image processing circuit 150 performs a predetermined image processing on an image signal generated by the imaging unit 110, and then stores the processed image signal in the image memory 151. In one embodiment, the image processing circuit 150 may be implemented as a logical circuit in the image reading apparatus 100. The logical circuit may be, for example, a large scale integration (LSI), an application specific integrated circuit (ASIC), a field-programming gate array (FPGA), or the like. In another embodiment, the image processing circuit 150 may be an electronic circuit including a processor such as a CPU and a digital signal processor (DSP), and a memory that stores a program executed by the processor.

The memory controller 152 controls operation of writing image data into the image memory 151, and operation of reading image data from the image memory 151. Further, the memory controller 152 performs operation of refreshing a dynamic random access memory (DRAM) included in the image memory 151.

The conveyance mechanism 153 includes the above-described paper feed roller 117, the retard roller 118, the first conveyance roller 119, the first driven roller 120, the second conveyance roller 121, the second driven roller 122, and the motors for driving these rollers. The conveyance mechanism controlling circuit 154 generates a driving signal for driving the conveyance mechanism 153 to convey a document.

The CPU 160 executes a control program 165 stored in the memory 161 to control operation of the image reading apparatus 100. The memory 161 also stores the data used when executing the control program 165 by the CPU 160. The memory 161 may include a nonvolatile storage device for storing the program, and a volatile memory for temporarily storing the data.

At the time of forwarding, to the information processing apparatus 200, image data on which the image processing circuit 150 has performed the image processing, the image data waiting to be forwarded is temporarily stored in the DMA buffer 162. The DMA buffer 162 is one example of a buffer memory. A storage area for the DMA buffer 162 may be provided in the memory 161, or may be provided as another storage device not illustrated in the drawing.

The DMAC 163 perform a DMA transfer to forward, from the image memory 151 to the DMA buffer 162, image data on which the image processing circuit 150 has performed the image processing. The wireless communication circuit 164 performs a process of communication with the information processing apparatus 200 through the AP 300.

Figure 5:
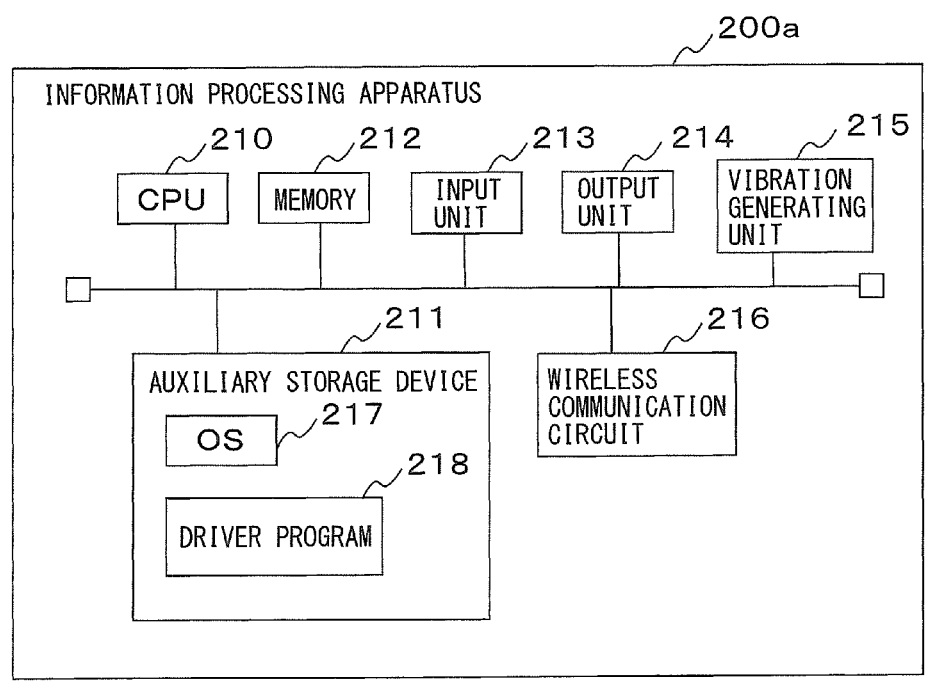
FIG. 5 illustrates one example of a hardware configuration of an information processing apparatus 200a according to an embodiment.

FIG. 5 illustrates one example of a hardware configuration of the information processing apparatus 200a according to an embodiment. The information processing apparatus 200b may have the same hardware configuration as the information processing apparatus 200a. The information processing apparatus 200a includes a CPU 210, an auxiliary storage device 211, a memory 212, an input unit 213, an output unit 214, a vibration generating unit 215, and a wireless communication circuit 216. The output unit 214 and the vibration generating unit 215 are one example of an alarm generator.

The auxiliary storage device 211 stores an operating system (OS) 217 and a driver program 218 that are executed by the CPU 210. The driver program 218 is a computer program for the information processing apparatus 200a to communicate with the image reading apparatus 100 via a wireless network, and to receive the image data having been read by the image reading apparatus 100.

The auxiliary storage device 211 may include a nonvolatile storage device, a read-only memory (ROM) or the like for storing the OS 217 and the driver program 218. For example, the driver program 218 may be provided in a state where the driver program 218 is stored in a portable recording medium. Alternatively, the driver program 218 may be downloaded via a wireless network to be installed in the auxiliary storage device 211 by using a known setup program or the like.

The memory 212 may include a volatile memory storing a program that is being currently executed by the CPU 210, and storing data temporarily used by this program. The input unit 213 is an input device that receives input operation by a user. The input unit 213 may be a keypad, a keyboard, a pointing device, a touch panel, or the like.

The output unit 214 is an output device for presenting, to a user, information processed by the information processing apparatus 200. For example, the output unit 214 may be a display device such as a crystal liquid display, a cathode ray tube (CRT) display and an organic electroluminescence display. Alternatively, the output unit 214 may be an audio output device such as a speaker.

The vibration generating unit 215 vibrates in accordance with a command from the CPU 210. The vibration generating unit 215 is used for informing a user that a predetermined event occurs, by vibration. The wireless communication circuit 216 performs a process of communication with the image reading apparatus 100 through the AP 300.

The hardware configurations illustrated in FIG. 4 and FIG. 5 are merely exemplifications for describing the embodiments. Any hardware configurations that perform operation described below may be adopted as hardware configurations for the image reading apparatus 100 and the information processing apparatus 200 described in the present specification.

Figure 6:
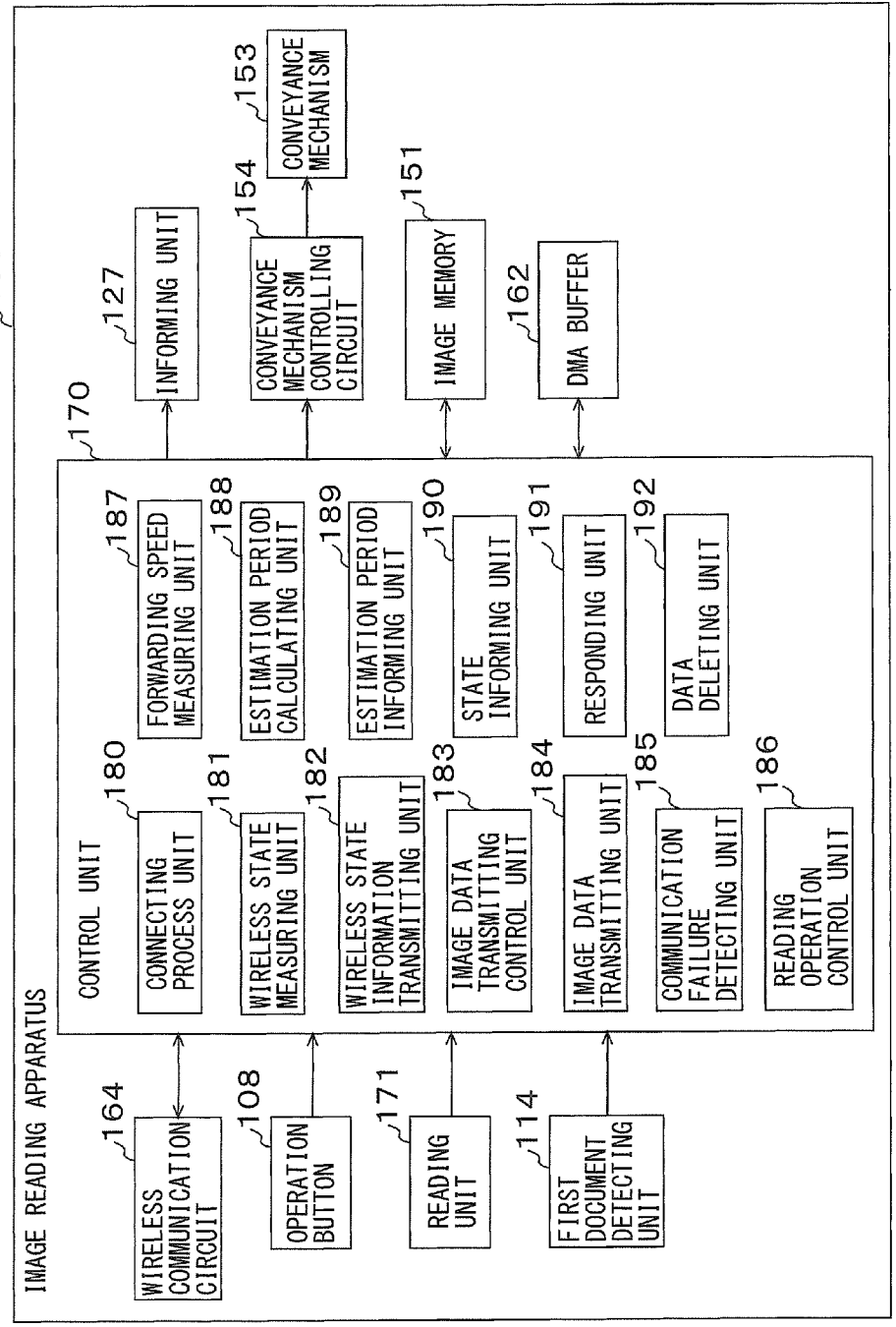
FIG. 6 illustrates one example of a functional configuration of the image reading apparatus 100.

FIG. 6 illustrates one example of a functional configuration of the image reading apparatus 100. The image reading apparatus 100 includes a control unit 170 and a reading unit 171. The control unit 170 performs a process of connecting with the information processing apparatus 200 through a wireless network, a process of forwarding image data, a process of controlling operation of the image reading apparatus 100, and a process of informing a user of a state of the image reading apparatus 100. The reading unit 171 reads a document to generate image data.

The control unit 170 includes a connecting process unit 180, a wireless state measuring unit 181, a wireless state information transmitting unit 182, an image data transmitting control unit 183, an image data transmitting unit 184, a communication failure detecting unit 185, and a reading operation control unit 186. The control unit 170 further includes a forwarding speed measuring unit 187, an estimation period calculating unit 188, an estimation period informing unit 189, a state informing unit 190, a responding unit 191, and a data deleting unit 192. The image data transmitting control unit 183 is one example of a packet length information receiver. The reading operation control unit 186 is one example of a reading speed control module.

The connecting process unit 180 connects the information processing apparatus 200 and the image reading apparatus 100 to each other, by wireless communication, i.e., a destination to which image data is forwarded from the image reading apparatus 100. When the connecting process unit 180 receives a connection request signal transmitted from the information processing apparatus 200, the connecting process unit 180 determines whether or not the information processing apparatus 200 can be connected to the image reading apparatus 100. When this connection is allowed, the connecting process unit 180 transmits a connection allowance signal to the information processing apparatus 200. When this connection is not allowed, the connecting process unit 180 transmits a connection non-allowance signal to the information processing apparatus 200.

For example, the connecting process unit 180 determines whether or not the information processing apparatus 200 is an apparatus previously registered in the image reading apparatus 100. When the information processing apparatus 200 is a previously registered apparatus, the connecting process unit 180 allows connection from the information processing apparatus 200. When the information processing apparatus 200 is not a previously registered apparatus, the connecting process unit 180 does not allow connection from the information processing apparatus 200.

For example, when authentication process with the information processing apparatus 200 is normally performed, the connecting process unit 180 may allow connection from the information processing apparatus 200. Further for example, while the image reading apparatus 100 is forwarding image data to one information processing apparatus 200a, the connecting process unit 180 does not allow connection from another information processing apparatus 200b.

When the wireless state measuring unit 181 receives, from the information processing apparatus 200, a request for wireless state information indicating a wireless state between the image reading apparatus 100 and the AP 300, the wireless state measuring unit 181 measures a wireless state between the image reading apparatus 100 and the AP 300. For example, in the present embodiment, the wireless state measuring unit 181 measures, as a wireless state between the image reading apparatus 100 and the AP 300, a reception intensity IRs of a wireless signal received by the wireless communication circuit 164 from the AP 300.

The wireless state information transmitting unit 182 transmits, to the information processing apparatus 200, wireless state information indicating a wireless state between the image reading apparatus 100 and the AP 300. For example, in the present embodiment, the wireless state information transmitting unit 182 transmits, to the information processing apparatus 200, wireless state information indicating a reception intensity IRs.

The image data transmitting control unit 183 controls a transmitting process of transmission of image data by the image data transmitting unit 184 to the information processing apparatus 200, the image data having been read by the image reading apparatus 100. When the image data transmitting control unit 183 receives an image data forwarding request from the information processing apparatus 200 in a period where the image data remains in the image memory 151, the image data transmitting control unit 183 causes the image data transmitting unit 184 to transmit the image data.

The image data transmitting unit 184 stores, in packets, the image data forwarded by the DMAC 163 from the image memory 151 to the DMA buffer 162, and transmit the packets. A packet length of the packet is determined by the information processing apparatus 200. The image data forwarding request includes packet length information that specifies the packet length determined by the information processing apparatus 200. The image data transmitting control unit 183 adjusts a packet length of the packet transmitted by the image data transmitting unit 184 such that the packet length becomes a length specified by the packet length information included in the image data forwarding request.

When the image data transmitting unit 184 fails to transmit the packet, the image data transmitting control unit 183 performs a retransmitting process that causes the image data transmitting unit 184 to retransmit the same packet.

The communication failure detecting unit 185 determines whether or not communication between the image reading apparatus 100 and the information processing apparatus 200 is disconnected. When connection between the image reading apparatus 100 and the information processing apparatus 200 is not recovered within a predetermined period, the communication failure detecting unit 185 detects a communication failure between the image reading apparatus 100 and the information processing apparatus 200. In addition, when time-out occurs in a retransmitting process by the image data transmitting control unit 183, the communication failure detecting unit 185 detects a communication failure between the image reading apparatus 100 and the information processing apparatus 200. When the communication failure detecting unit 185 detects a communication failure, the image data transmitting control unit 183 stops transmission of the image data.

The reading operation control unit 186 controls operation of reading a document. The reading operation control unit 186 controls operation of conveying a document by the conveyance mechanism 153 driven by the conveyance mechanism controlling circuit 154, timing of reading a document by the imaging unit 110, and the like.

The reading operation control unit 186 monitors an available space of the DMA buffer 162. In accordance with an available space of the DMA buffer 162, the reading operation control unit 186 changes a speed of reading a document by the image reading apparatus 100. For example, when an available space of the DMA buffer 162 is equal to or larger than a predetermined threshold Thb, the reading operation control unit 186 sets a speed of reading documents by the image reading apparatus 100 as a relatively high speed V1 (the number of sheets per minute). Meanwhile, when an available space of the DMA buffer 162 is lower than the predetermined threshold Thb, the reading operation control unit 186 sets a speed of reading documents by the image reading apparatus 100 as a relatively low speed V2 (the number of sheets per minute). For example, the threshold Thb may be determined by multiplying an average data amount of document image data per page by the predetermined number of pages, the average data amount being determined in accordance with current reading resolution and a current reading image mode.

When an available space does not exist in the DMA buffer 162, the reading operation control unit 186 determines whether or not a next document exists on the document holder 103, on the basis of a first document detection signal output by the first document detecting unit 114. When a next document exists on the document holder 103, the reading operation control unit 186 causes reading of a document to be stopped. When the communication failure detecting unit 185 detects a communication failure, the reading operation control unit 186 causes reading of a document to be stopped.

When the image data transmitting unit 184 transmits image data, the forwarding speed measuring unit 187 measures a speed of forwarding the image data. On the basis of a data amount of the image data remaining in the DMA buffer 162, and the speed of forwarding, the estimation period calculating unit 188 calculates an estimated period up to the time that forwarding of image data remaining in the DMA buffer 162 is completed. The estimation period informing unit 189 informs the information processing apparatus 200 of the estimated period.

The state informing unit 190 performs a process for informing a user of a state of the image reading apparatus 100. For example, in a period where the image reading apparatus 100 is forwarding image data to the information processing apparatus 200, the state informing unit 190 causes the informing unit 127 to display that the image reading apparatus 100 is being used. When the communication failure detecting unit 185 detects a communication failure, the state informing unit 190 may cause the informing unit 127 to display the occurrence of the communication failure between the image reading apparatus 100 and the information processing apparatus 200.

When the image reading apparatus 100 starts to read a document, the state informing unit 190 informs the information processing apparatus 200 of a start of document reading. The state informing unit 190 informs the information processing apparatus 200 of a start of image data forwarding, when the image reading apparatus 100 starts to forward the image data to the information processing apparatus 200.

When the responding unit 191 receives, from the information processing apparatus 200, a state inquiry signal for inquiring of a state of the image reading apparatus 100, the responding unit 191 performs a process of responding to the state inquiry signal. For example, when responding unit 191 receives a state inquiry signal transmitted from one information processing apparatus 200a, the responding unit 191 determines whether or not the image reading apparatus 100 is forwarding image data to another information processing apparatus 200b.

When the image reading apparatus 100 is forwarding image data to another information processing apparatus 200b, the responding unit 191 transmits, to the information processing apparatus 200a, a state indication signal indicating that image data is being forwarded. When the image reading apparatus 100 is not forwarding image data to another information processing apparatus 200b, the responding unit 191 transmits, to the information processing apparatus 200a, a state indication signal indicating that image data is not being forwarded. The state inquiry signal and state indication signal are examples of the first signal and the second signal, respectively.

Instead of a state indication signal indicating whether or not image data is being forwarded to another information processing apparatus 200b, a state indication signal indicating whether or not another information processing apparatus 200b is currently connected to the image reading apparatus 100 may be transmitted by the responding unit 191 to the information processing apparatus 200a. Instead of a state inquiry signal, a connection request signal may be used, and instead of a state indication signal, a connection allowance signal and a connection non-allowance signal may be used to inform the information processing apparatus 200 of a state of the image reading apparatus 100. In this case, the connection request signal is an example of the first signal, and the connection allowance signal and the connection non-allowance signal are examples of the second signal.

The data deleting unit 192 deletes image data stored in the image memory 151 and the DMA buffer 162 when the information processing apparatus 200b, different from the information processing apparatus 200a to which image data was forwarded at the last reading time, is connected to the image reading apparatus 100.

The above-described operation of the control unit 170 is performed by the CPU 160 executing the control program 165 in FIG. 4. The above-described operation of the reading unit 171 is performed by the imaging unit 110 and the image processing circuit 150.

Figure 7:
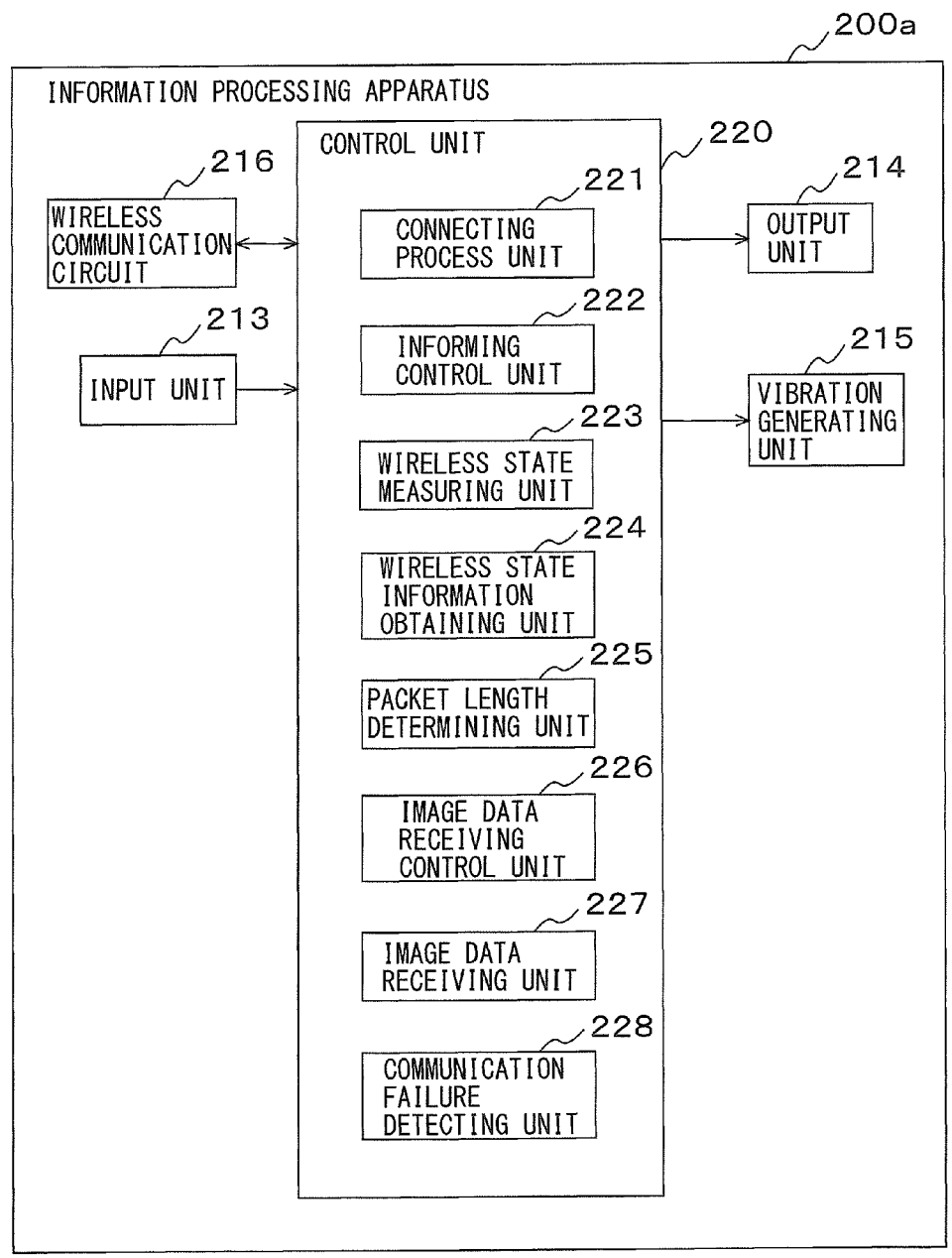

FIG. 7 illustrates one example of a functional configuration of the information processing apparatus 200a. The information processing apparatus 200b may have the same functional configuration as the information processing apparatus 200a. The information processing apparatus 200a includes a control unit 220. The control unit 220 performs a process of connecting with the image reading apparatus 100 through a wireless communication network, a process for forwarding image data from the image reading apparatus 100 to the information processing apparatus 200a, and a process of informing a user of a state of the image reading apparatus 100.

The control unit 220 includes a connecting process unit 221, an informing control unit 222, a wireless state measuring unit 223, a wireless state information obtaining unit 224, a packet length determining unit 225, an image data receiving control unit 226, an image data receiving unit 227, and a communication failure detecting unit 228. The wireless state information obtaining unit 224 is one example of a wireless state information receiver. The image data receiving control unit 226 is one example of a packet length information transmitter.

The connecting process unit 221 connects the image reading apparatus 100 and the information processing apparatus 200a to each other by wireless communication, the image reading apparatus 100 being a transmitter of image data. The connecting process unit 221 transmits a connection request signal to the image reading apparatus 100. When the connecting process unit 221 receives a connection allowance signal, from the image reading apparatus 100, as a response to the connection request signal, the information processing apparatus 200a succeeds in connecting to the image reading apparatus 100. Meanwhile, when the connecting process unit 221 receives a connection non-allowance signal, connection fails.

The informing control unit 222 controls informing output from the output unit 214 to a user. When the information processing apparatus 200a succeeds in connecting to the image reading apparatus 100, the output unit 214 makes informing output indicating that the image reading apparatus 100 can read a document. In the present embodiment, the output unit 214 is a display device, and the informing control unit 222 causes the output unit 214 to display a usable state screen image indicating that a document can be read.

Figure 8:
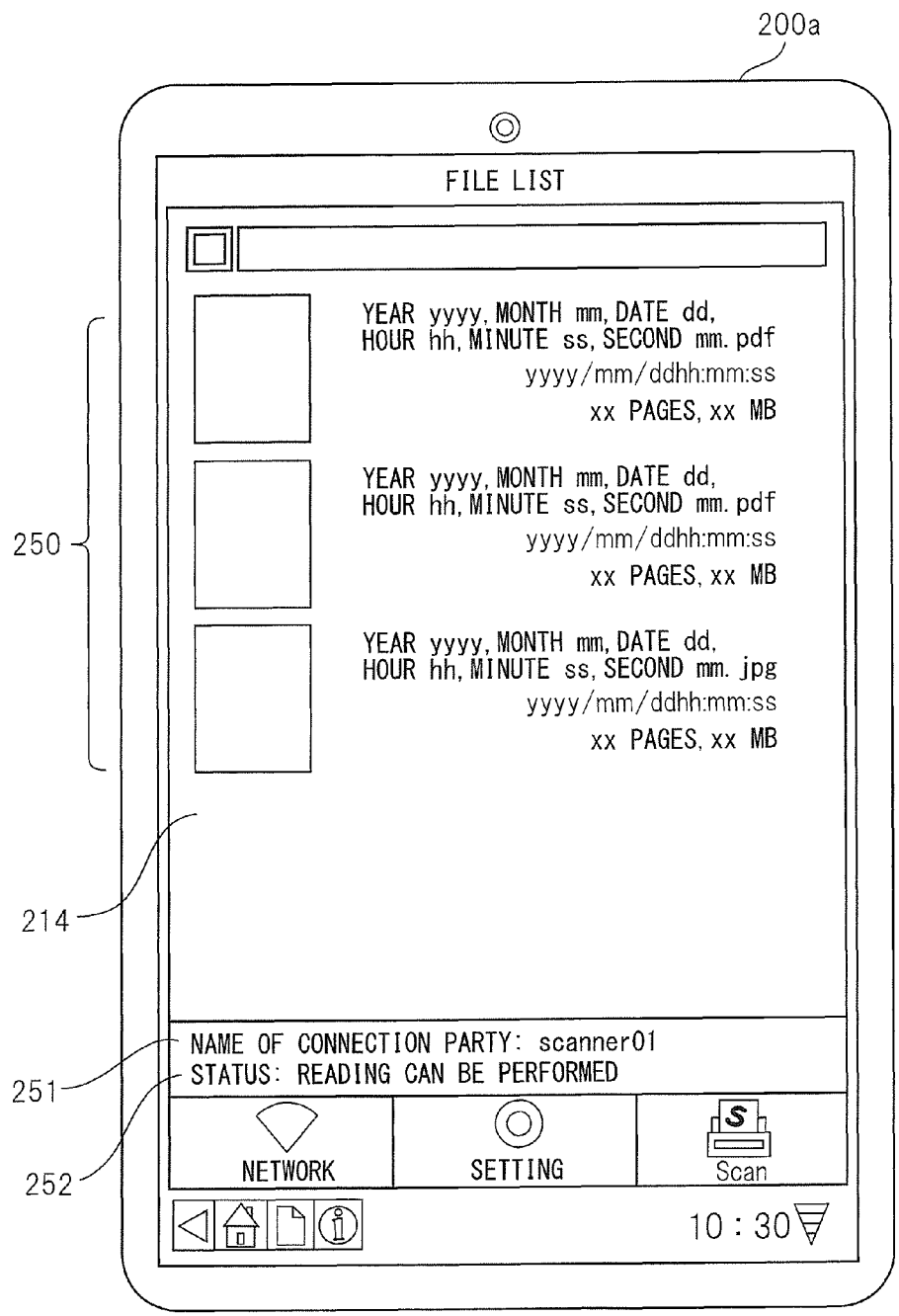
FIG. 8 illustrates one example of a usable state screen image.

FIG. 8 illustrates one example of the usable state screen image. Displayed in the usable state screen image displayed by the output unit 214 are a list display area 250, a connection party display column 251, and a status display column 252. Displayed in the list display area 250 is a list of image data that has been forwarded to the information processing apparatus 200a. Displayed in the connection party list column 251 is an identifier "scanner01" of the image reading apparatus 100 to which the information processing apparatus 200a is currently connected.

Displayed in the status display column 252 is a state of the image reading apparatus 100 to which the information processing apparatus 200a is currently connected. In the usable state screen image, a message "reading can be performed" is displayed in the status display column 252, indicating that the image reading apparatus 100 can read a document.

Description is made referring to FIG. 7. The informing control unit 222 transmits a state inquiry signal to the image reading apparatus 100. When a state indication signal received from the image reading apparatus 100 indicates that the image reading apparatus 100 is forwarding image data to another information processing apparatus 200b, the informing control unit 222 causes the output unit 214 to display a non-usable state dialogue.

Figure 9:
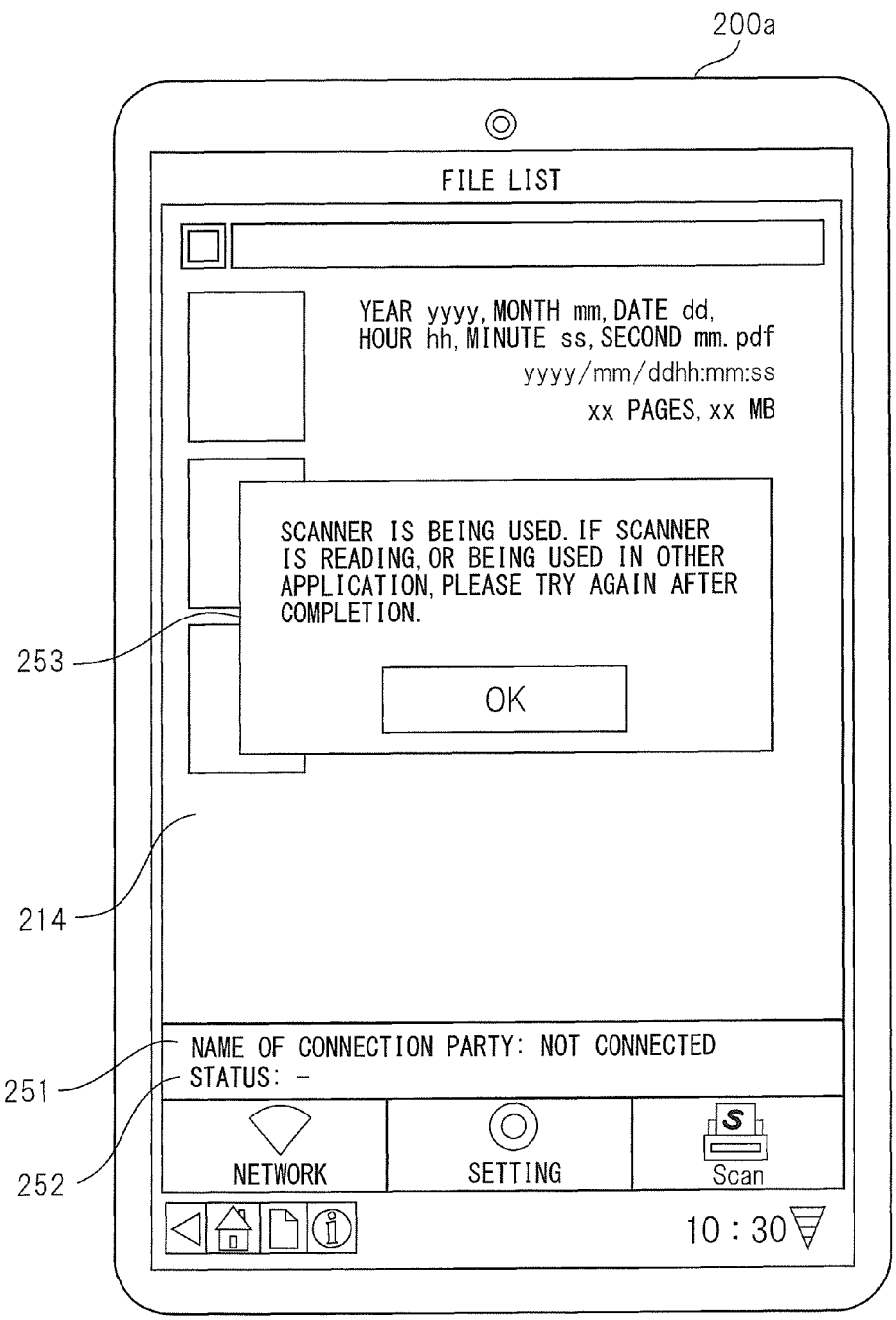
FIG. 9 illustrates one example of a non-usable state dialogue.

FIG. 9 illustrates one example of the non-usable state dialogue. The non-usable state dialogue 253 displayed in the output unit 214 is an error display indicating that the image reading apparatus 100 is unable to be used.

Description is made referring to FIG. 7. The wireless state measuring unit 223 measures a wireless state between the information processing apparatus 200 and the AP 300. In the present embodiment, the wireless state measuring unit 223 measures, as a wireless state between the information processing apparatus 200 and the AP 300, a reception intensity IRm of a wireless signal received by the wireless communication circuit 216 from the AP 300.

The wireless state information obtaining unit 224 requests, to the image reading apparatus 100, a wireless state information indicating a wireless state between the image reading apparatus 100 and the AP 300. The wireless state information obtaining unit 224 receives wireless state information from the image reading apparatus 100. In the present embodiment, wireless state information indicates a reception intensity IRs of a wireless signal received by the image reading apparatus 100 from the AP 300.

The packet length determining unit 225 determines whether or not data forwarding of data having a predetermined size is completed within a predetermined period of time in forwarding of image data from the image reading apparatus 100 to the information processing apparatus 200. When the data forwarding is not completed within the predetermined period of time, the packet length determining unit 225 determines whether or not a reception intensity IRm is lower than a predetermined threshold Thr. Further, the packet length determining unit 225 determines whether or not a reception intensity IRs is lower than the threshold Thr. The threshold Thr may be "−75 [dBm]", for example.

When at least one of the reception intensities IRm and IRs is lower than the threshold Thr, the packet length determining unit 225 reduces a packet length of packets in which image data is stored at the time of forwarding of image data from the image reading apparatus 100. The packet length determining unit 225 may select a packet length from 4 sizes of 256 bytes, 128 bytes, 64 bytes, and 32 bytes, for example. When a packet length is the minimum size of 32 bytes, the packet length determining unit 225 does not reduce the packet length.

When data forwarding is completed within the predetermined period of time, the packet length determining unit 225 determines whether or not a reception intensity IRm is equal to or larger than the predetermined threshold Thr. Further, the packet length determining unit 225 determines whether or not a reception intensity IRs is equal to or larger than the threshold Thr. When both of the reception intensities IRm and IRs are equal to or larger than the threshold Thr, the packet length determining unit 225 increases a packet length of packets. In the case of the above-described example, when a packet length is the maximum size of 256 bytes, the packet length determining unit 225 does not increase the packet length.

When data forwarding of data having a predetermined size is not completed within the predetermined period of time, and at least one of the reception intensities IRm and IRs is lower than the threshold Thr, the informing control unit 222 causes the output unit 214 to display a warning dialogue.

Figure 10:
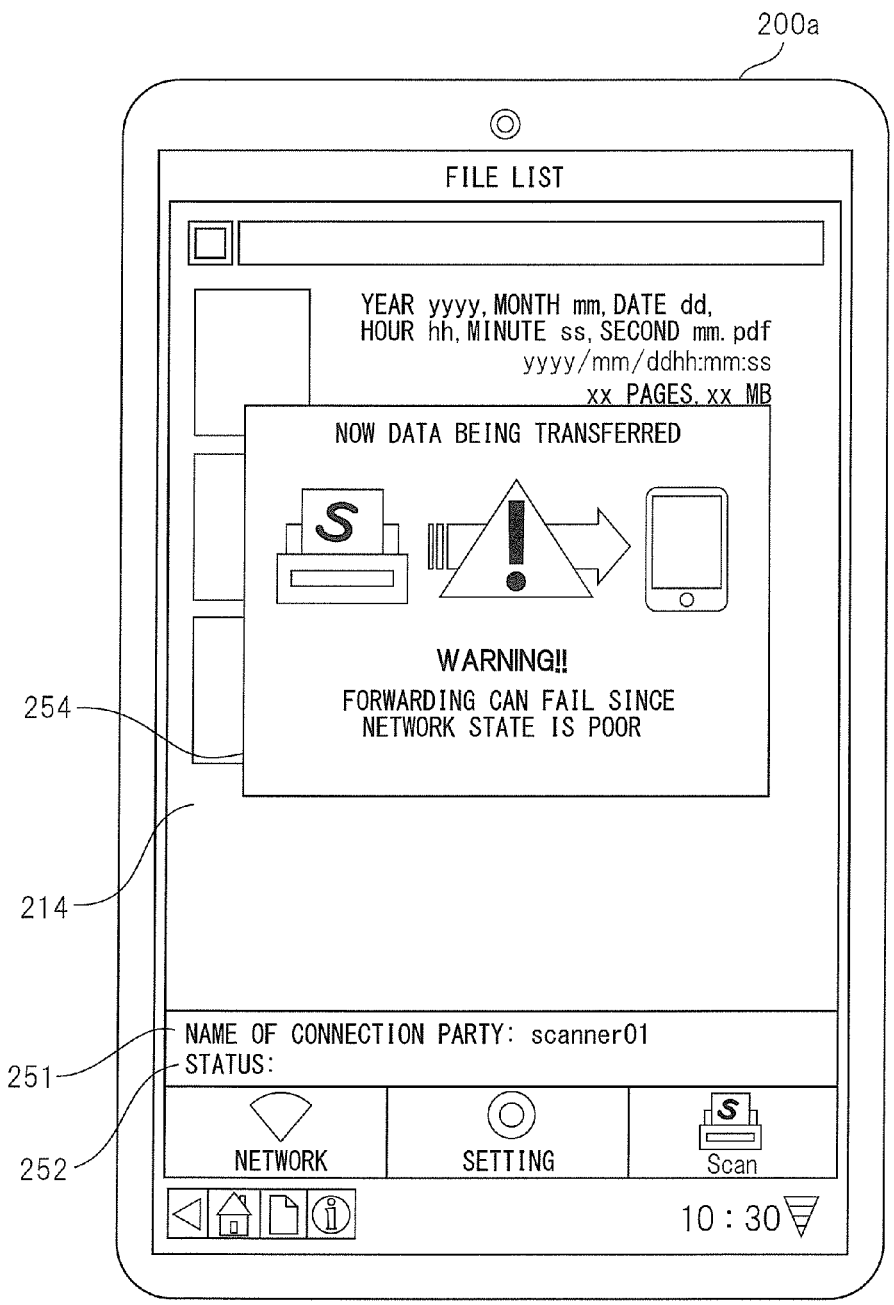
FIG. 10 illustrates one example of a warning dialogue.

FIG. 10 illustrates one example of the warning dialogue. The warning dialogue 254 is a warning display that informs that forwarding has failed due to a poor wireless state between the image reading apparatus 100 and the AP 300 or between the information processing apparatus 200 and the AP 300.

Figure 11:
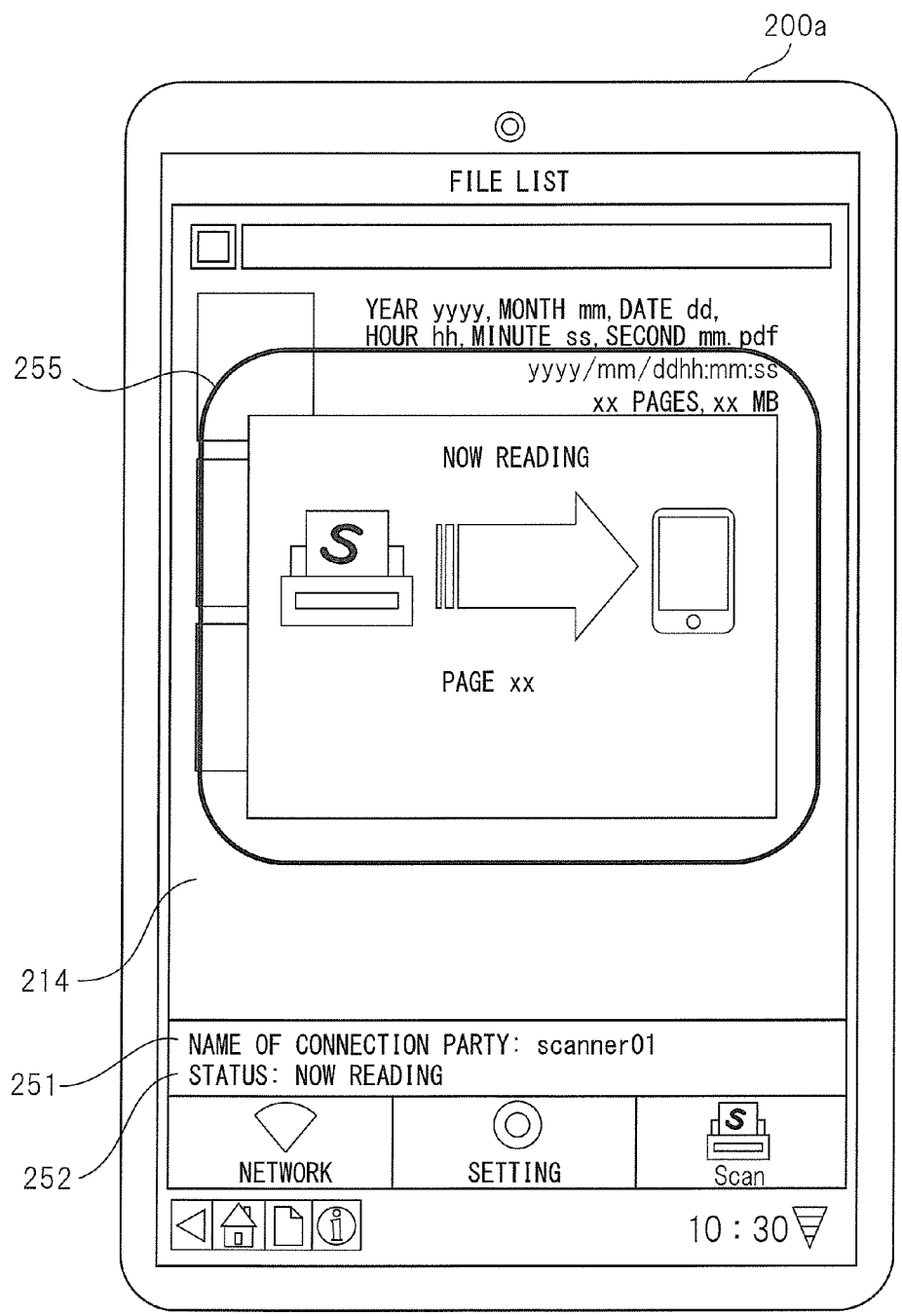
FIG. 11 illustrates one example of a reading state screen image.

When the image reading apparatus 100 starts to read a document, and a start of document reading is notified by the image reading apparatus 100, the informing control unit 222 causes the output unit 214 to display a reading state screen image. FIG. 11 illustrates one example of the reading state screen image. In the reading state screen image, the output unit 214 displays a dialogue 255 indicating that a document is being read.

Description is made referring to FIG. 7. The image data receiving control unit 226 controls a process of receiving image data forwarded from the image reading apparatus 100. The image data receiving control unit 226 transmits an image data forwarding request to the image reading apparatus 100 when the image data receiving unit 227 becomes able to receive image data. The image data receiving control unit 226 stores, in the image data forwarding request, packet length information that specifies the packet length determined by the packet length determining unit 225 and then transmits the image data forwarding request. In another embodiment, the image data receiving control unit 226 may transmit the packet length information separately from the image data forwarding request.

Figure 12:
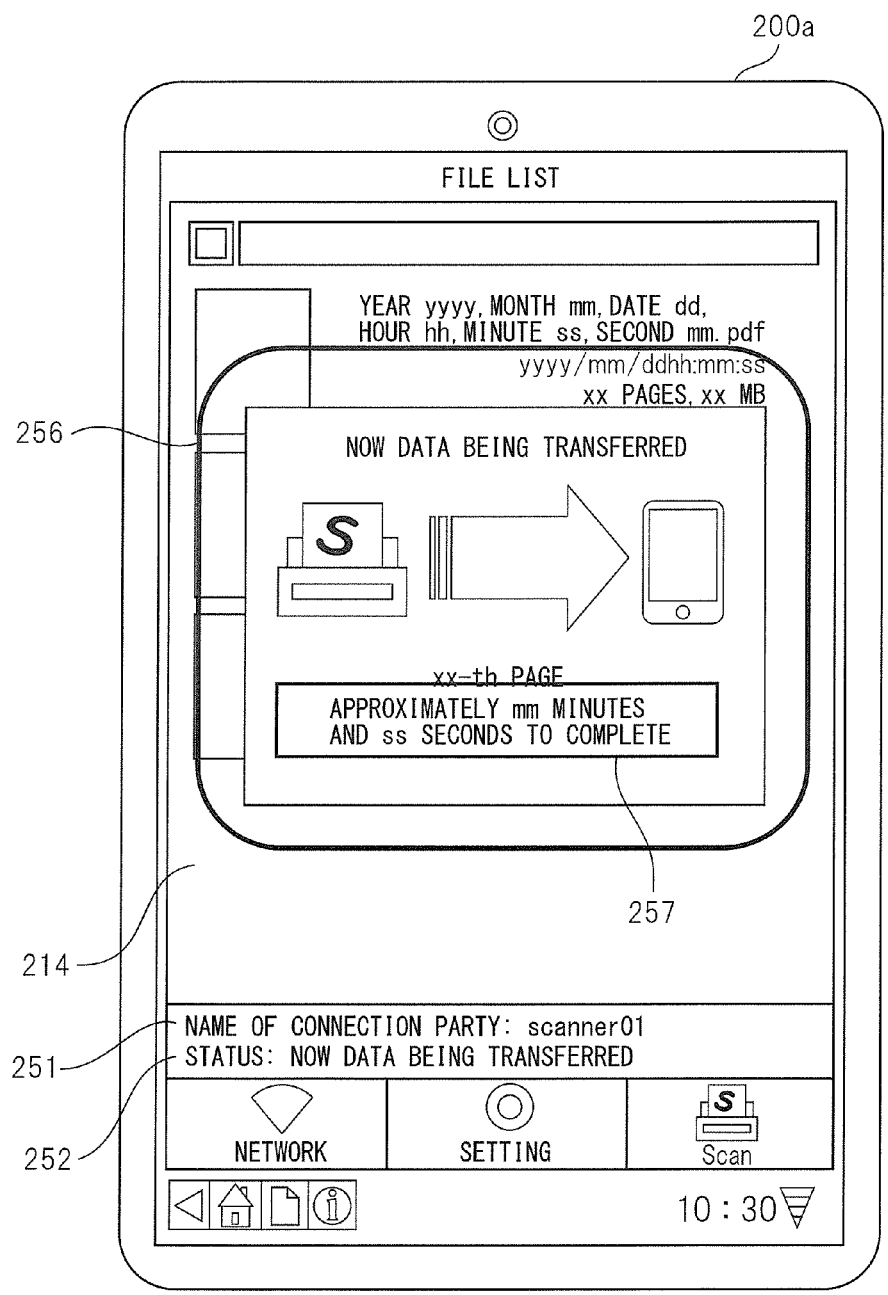
FIG. 12 illustrates one example of a forwarding state screen image.

When the image reading apparatus 100 starts to forward image data, and a start of forwarding the image data is notified by the image reading apparatus 100, the informing control unit 222 causes the output unit 214 to display a forwarding state screen image. FIG. 12 illustrates one example of the forwarding state screen image. In the forwarding state screen image, the output unit 214 displays a dialogue 256 indicating that image data is being forwarded.

During forwarding of the image data, the informing control unit 222 receives, from the image reading apparatus 100, information of an estimated period up to the time that forwarding of the image data is completed. The informing control unit 222 causes the estimated period informed by the image reading apparatus 100 to be displayed in a region 257 in the dialogue 256.

The communication failure detecting unit 228 determines whether or not communication between the image reading apparatus 100 and the information processing apparatus 200 is disconnected. When connection between the image reading apparatus 100 and the information processing apparatus 200 is not recovered within a predetermined period of time, the communication failure detecting unit 228 detects a communication failure between the image reading apparatus 100 and the information processing apparatus 200. Also when timeout occurs in a retransmitting process in a process of transmitting image data from the image reading apparatus 100, the communication failure detecting unit 228 detects a communication failure between the image reading apparatus 100 and the information processing apparatus 200.

When the communication failure detecting unit 228 detects a communication failure, the image data receiving control unit 226 stops receiving of image data. Further, the informing control unit 222 causes the output unit 214 to display an abnormal end dialogue.

Figure 13:
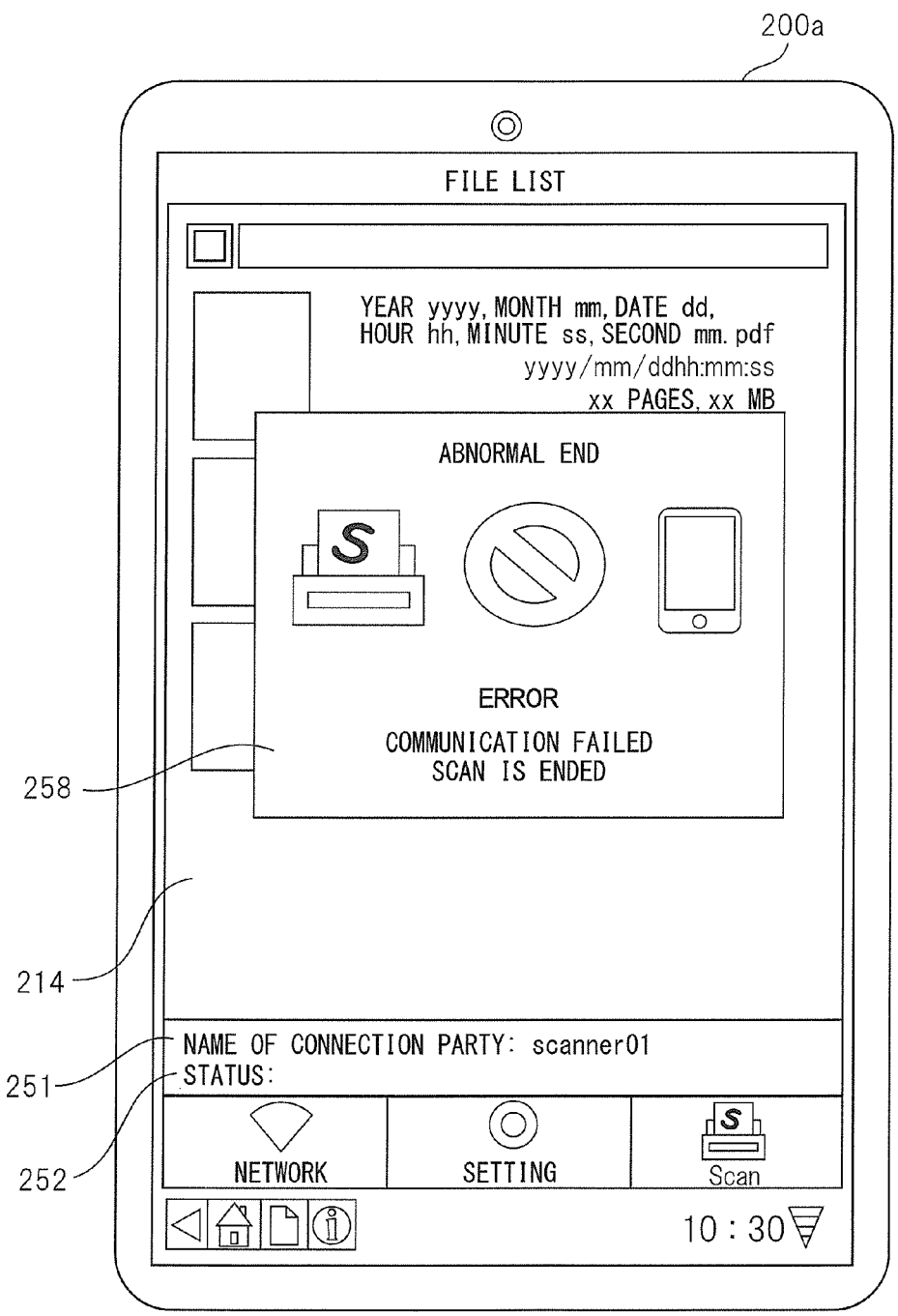
FIG. 13 illustrates one example of an abnormal end dialogue.

FIG. 13 illustrates one example of the abnormal end dialogue. The abnormal end dialogue 258 is an error display indicating that communication with the image reading apparatus 100 has failed, and forwarding of image data has abnormally ended.

When communication between the image reading apparatus 100 and the information processing apparatus 200 is disconnected, the image data receiving control unit 226 temporarily stops receiving data. When the connection is recovered within a set period of time, the image data receiving control unit 226 resumes receiving data.

When communication between the image reading apparatus 100 and the information processing apparatus 200 is disconnected, the informing control unit 222 causes the output unit 214 to display the same warning dialogue as the dialogue 254 illustrated in FIG. 10. The informing control unit 222 may cause the vibration generating unit 215 to vibrate the information processing apparatus 200 to inform a user of an alarm and an error, in addition to or instead of displaying a warning and error such as the non-usable state dialogue, the warning dialogue, and the abnormal end dialogue.

The above-described operation of the control unit 220 is performed by executing the driver program 218 by the CPU 210 in FIG. 5.

The functional configuration diagrams of FIG. 6 and FIG. 7 mainly illustrate configurations related to functions that are possessed by the image reading apparatus 100 and the information processing apparatus 200a, described in the present specification. The image reading apparatus 100 and the information processing apparatus 200a may include constituting elements other than the illustrated constituting elements.

Figure 14:
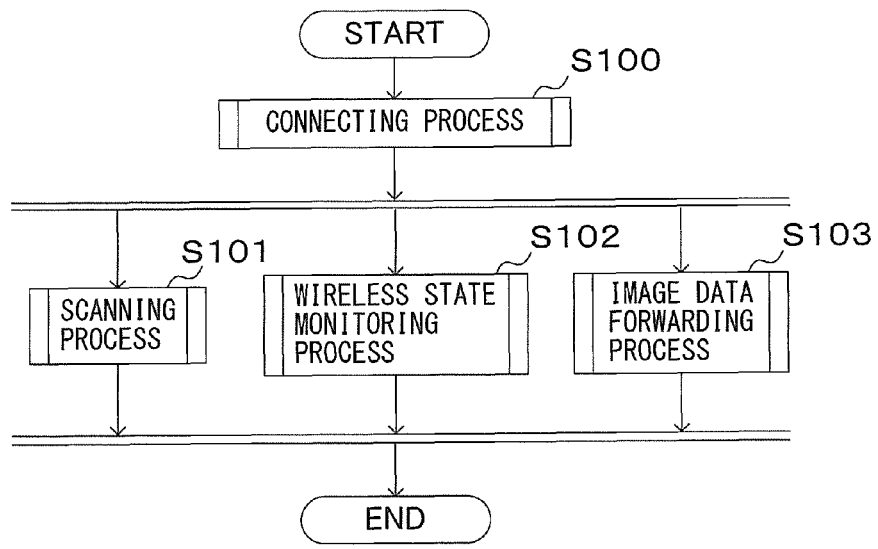
FIG. 14 is a flowchart indicating an example of an entire process performed by the image reading apparatus 100.

FIG. 14 is a flowchart indicating one example of an entire process performed by the image reading apparatus 100. Referring to the flowchart of FIG. 14, an operational example of an entire process by the image reading apparatus 100 is described in the following. In a connecting process at the step S100, the image reading apparatus 100 connects the information processing apparatus 200a and the image reading apparatus 100 to each other by wireless communication.

A scanning process at the step S101, a wireless state monitoring process at the step S102, and an image data forwarding process at the step S103 are performed in parallel. At the step S101, the image reading apparatus 100 performs the scanning process of reading a document to generate image data of the document.

In the wireless state monitoring process at the step S102, the image reading apparatus 100 measures a wireless state between the image reading apparatus 100 and the AP 300 to transmit the wireless state information to the information processing apparatus 200a. In the image data forwarding process at the step S103, the image reading apparatus 100 receives packet length information that is determined by the information processing apparatus 200a in accordance with the wireless state information. The image reading apparatus 100 stores image data in the packets with the specified packet length to transmit the stored image data to the information processing apparatus 200a.

Figure 15:
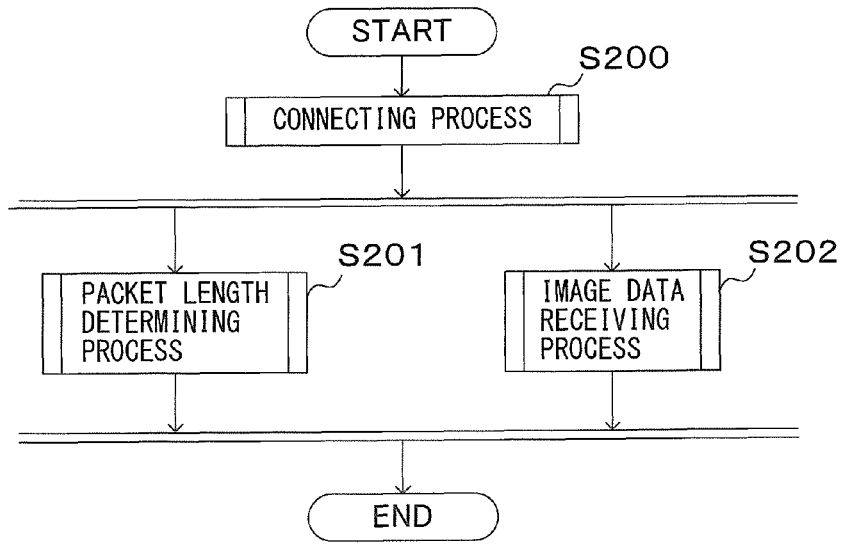

FIG. 15 is a flowchart indicating an example of an entire process performed by the information processing apparatus 200a. In a connecting process at the step S200, the information processing apparatus 200a connects the information processing apparatus 200a and the image reading apparatus 100 to each other by wireless communication. A packet length determining process at the step S201, and an image data receiving process at the step S202 are performed in parallel.

In the packet length determining process at the step S201, in accordance with a wireless state between the image reading apparatus 100 and the AP 300, and a wireless state between the information processing apparatus 200a and the AP 300, the information processing apparatus 200a determines a packet length of packets that carries image data from the image reading apparatus 100. In the image data receiving process at the step S202, the information processing apparatus 200a receives the image data from the image reading apparatus 100.

Figure 16:
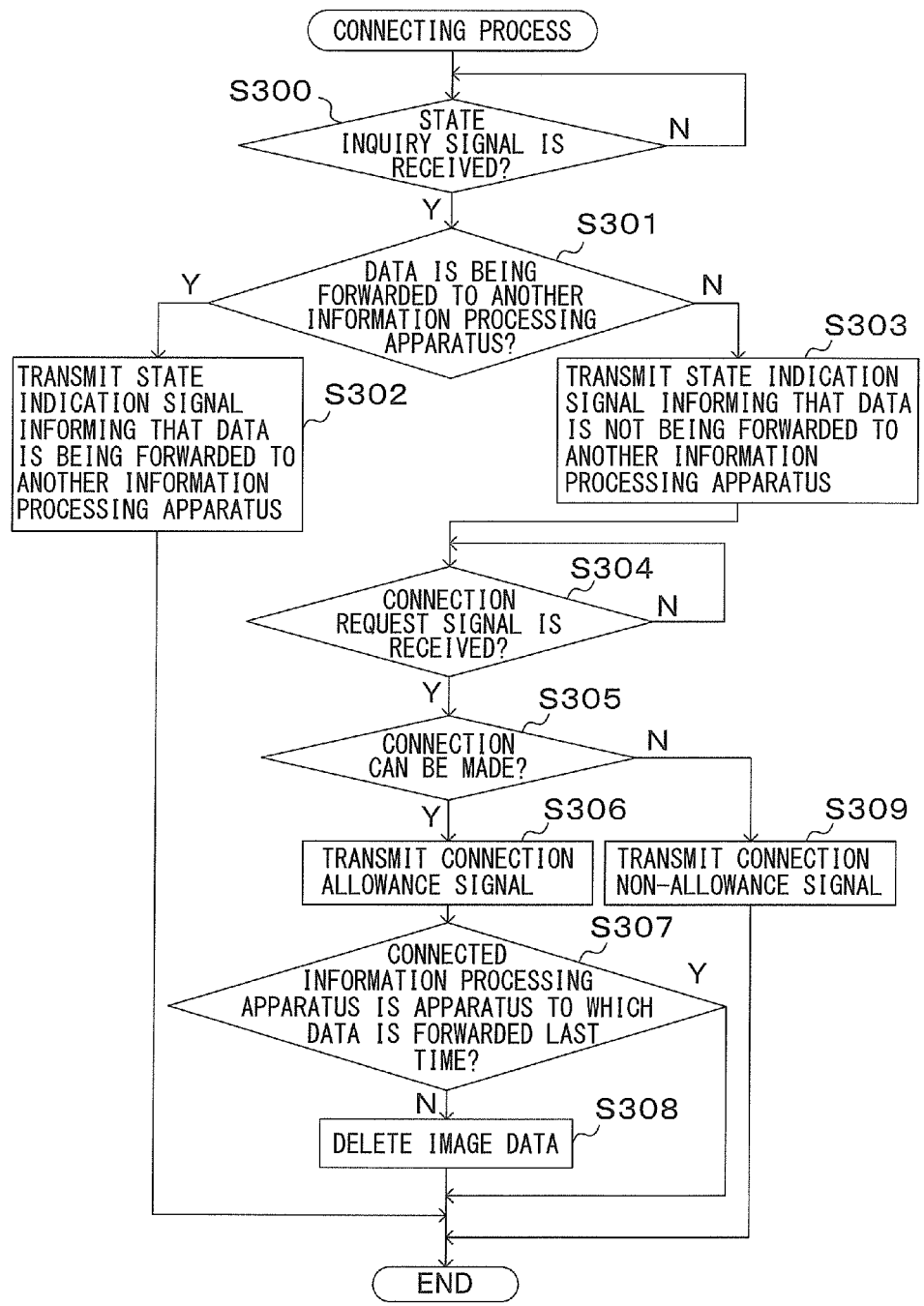
FIG. 16 is a flowchart indicating an example of a connecting process performed by the image reading apparatus 100.

FIG. 16 is a flowchart indicating an example of the connecting process performed by the image reading apparatus 100. At the step S300, the responding unit 191 illustrated in FIG. 6 determines whether or not the image reading apparatus 100 receives, from the information processing apparatus 200a, a state inquiry signal for inquiring for a state of the image reading apparatus 100. When the image reading apparatus 100 receives the state inquiry signal (yes at the step S300), the process proceeds to the step S301. When the image reading apparatus 100 does not receive the state inquiry signal (no at the step S300), the process returns to the step S300.

At the step S301, the responding unit 191 determines whether or not the image reading apparatus 100 is forwarding image data to another information processing apparatus 200b. When the image reading apparatus 100 is forwarding image data (yes at the step S301), the process proceeds to the step S302. When the image reading apparatus 100 is not forwarding image data (no at the step S301), the process proceeds to the step S303.

At the step S302, the responding unit 191 transmits, to the information processing apparatus 200a, a state indication signal informing that image data is being forwarded. Then, the connecting process is terminated.

At the step S303, the responding unit 191 transmits, to the information processing apparatus 200a, a state indication signal informing that image data is not being forwarded. At the step S304, the connecting process unit 180 determines whether or not the image reading apparatus 100 receives a connection request signal transmitted from the information processing apparatus 200a. When the image reading apparatus 100 receives the connection request signal (yes at the step S304), the process proceeds to the step S305. When the image reading apparatus 100 does not receive the connection request signal (no at the step S304), the process returns to the step S304.

At the step S305, the connecting process unit 180 determines whether or not connection to the image reading apparatus 100 from the information processing apparatus 200a is allowed. When the connection is allowed (yes at the step S305), the process proceeds to the step S306. When the connection is not allowed (no at the step S305), the process proceeds to the step S309.

At the step S306, the connecting process unit 180 transmits a connection allowance signal to the information processing apparatus 200a. At the step S307, the data deleting unit 192 determines whether or not the information processing apparatus 200a to which connection was made is an apparatus to which image data was forwarded at the last reading time. When the information processing apparatus 200a is not an apparatus to which image data was forwarded at the last time (no at the step S307), the process proceeds to the step S308. When the information processing apparatus 200a is an apparatus to which image data was forwarded at the last time (yes at the step S307), the connecting process is terminated.

At the step S308, the data deleting unit 192 deletes image data stored in the image memory 151 and the DMA buffer 162. Then, the connecting process is terminated. At the step S309, the connecting process unit 180 transmits a connection non-allowance signal to the information processing apparatus 200a. Then, the process is terminated.

Figure 17:
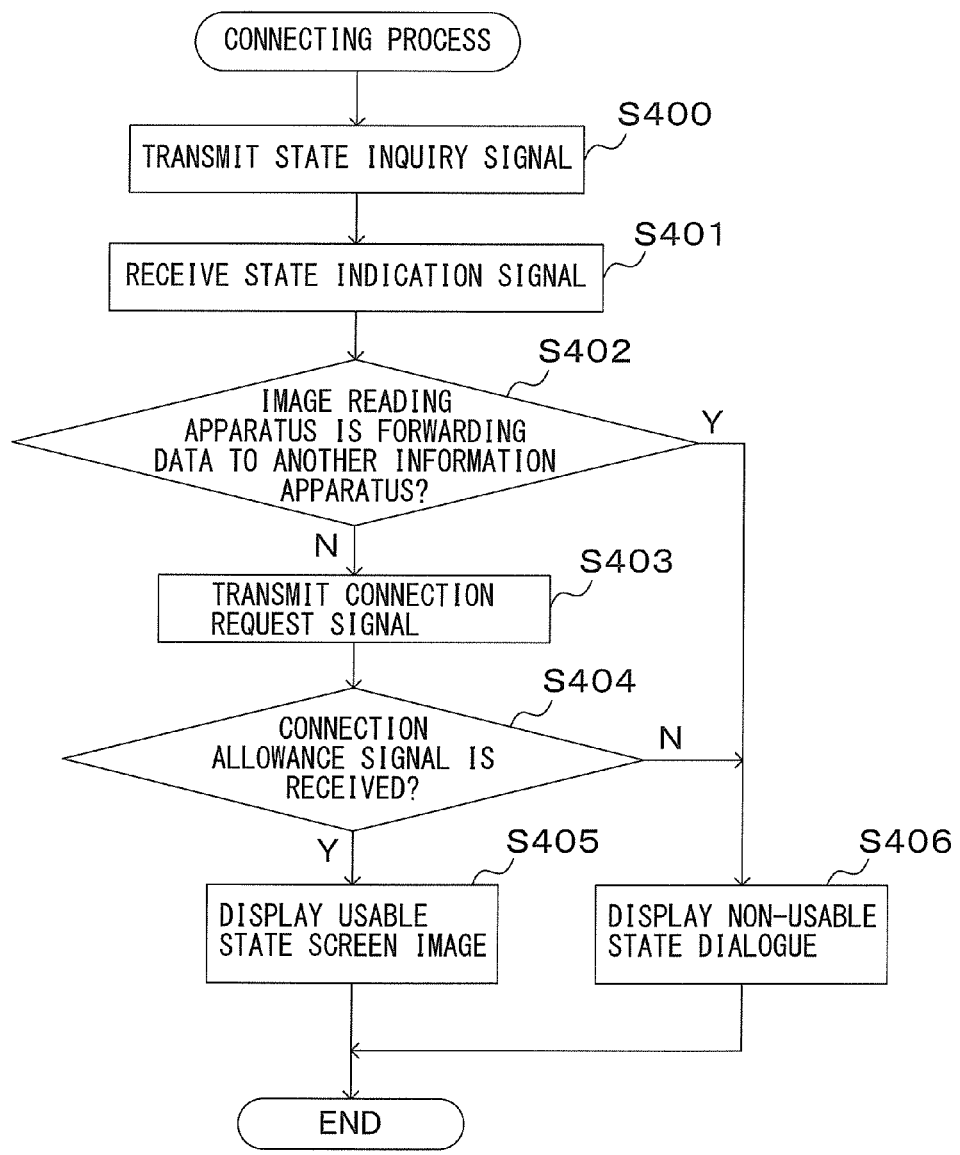

FIG. 17 is a flowchart indicating an example of a connecting process performed by the information processing apparatus 200a. At the step S400, the informing control unit 222 in FIG. 7 transmits a state inquiry signal to the image reading apparatus 100. At the step S401, the informing control unit 222 receives a state indication signal from the image reading apparatus 100.

At the step S402, on the basis of the state indication signal, the informing control unit 222 determines whether or not the image reading apparatus 100 is forwarding image data to another information processing apparatus 200b. When the image reading apparatus 100 is not forwarding image data (no at the step S402), the process proceeds to the step S403. When the image reading apparatus 100 is forwarding image data (yes at the step S402), the process proceeds to the step S406.

At the step S403, the connecting process unit 221 transmits a connecting request signal to the image reading apparatus 100. At the step S404, the connecting process unit 221 determines whether or not the information processing apparatus 200a receives the connection allowance signal from the image reading apparatus 100. When the connection allowance signal is received (yes at the step S404), the process proceeds to the step S405. When the connection allowance signal is not received (no at the step S404), the process proceeds to the step S406.

At the step S405, the informing control unit 222 causes the output unit 214 to display the usable state screen image of FIG. 8. Then, the process is terminated. At the step S406, the informing control unit 222 causes the output unit 214 to display the non-usable state dialogue of FIG. 9. Then, the process is terminated.

Figure 18:
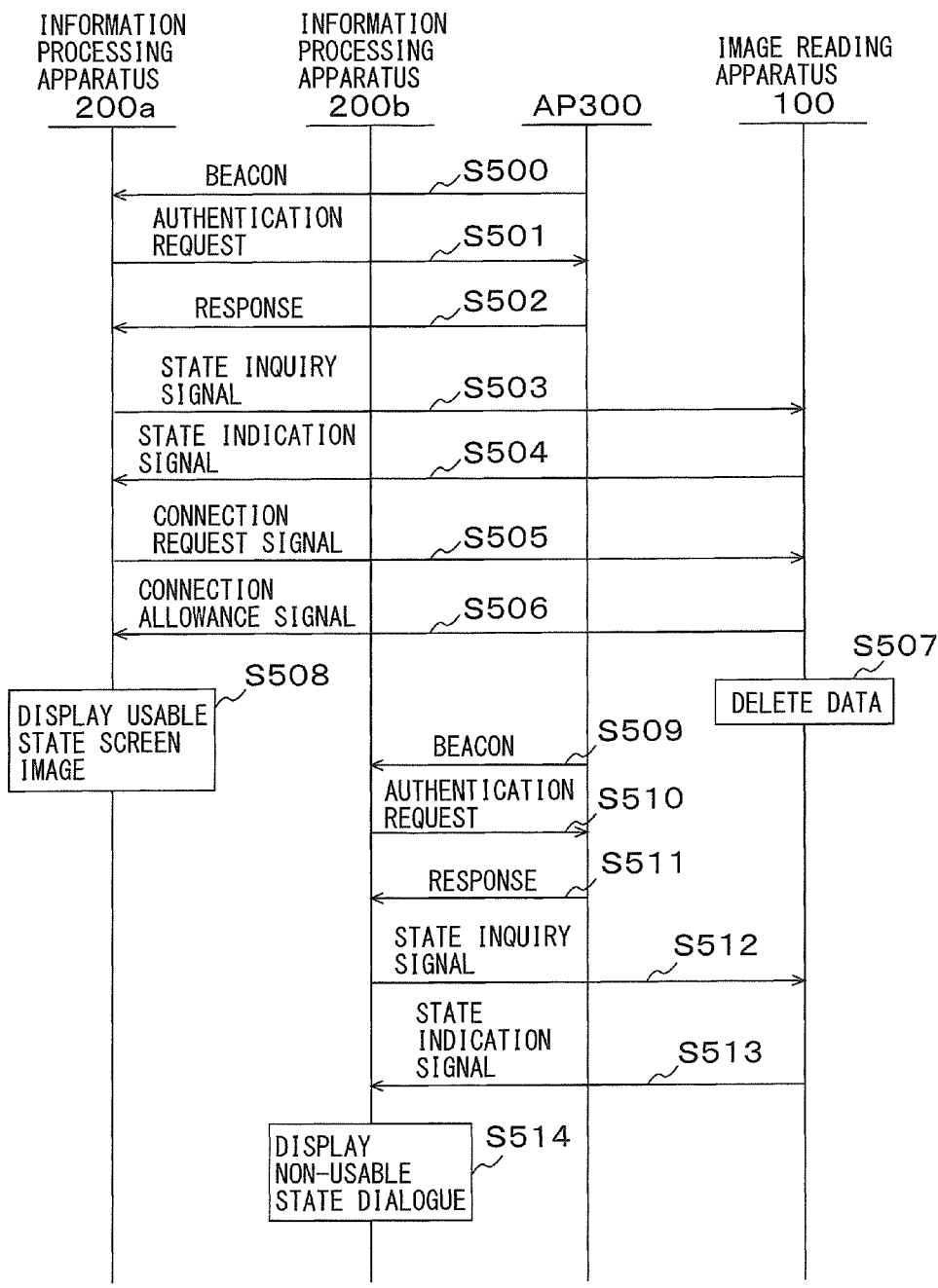
FIG. 18 illustrates an example of a signal sequence in the connecting process.

FIG. 18 illustrates an example of a signal sequence in the connecting process. At the step S500, the information processing apparatus 200a receives a beacon transmitted from the AP 300. At the step S501, the information processing apparatus 200a transmits an authentication request for a connection to a wireless network. When an authentication process is normally completed, at the step S502, the information processing apparatus 200a receives a response from the AP 300 to be connected to the wireless network.

At the step S503, the information processing apparatus 200a transmits a state inquiry signal to the image reading apparatus 100. When the image reading apparatus 100 is not forwarding image data to any information processing apparatuses 200, at the step S504, the image reading apparatus 100 transmits, to the information processing apparatus 200a, a state indication signal indicating that data is not being forwarded.

At the step S505, the information processing apparatus 200a transmits a connecting request signal to the image reading apparatus 100. When the image reading apparatus 100 allows the information processing apparatus 200a to be connected thereto, at the step S506, the image reading apparatus 100 transmits a connection allowance signal to the information processing apparatus 200a.

When the information processing apparatus 200a is not an information processing apparatus 200 to which image data was forwarded last time, at the step S507, the image reading apparatus 100 deletes image data stored in the image memory 151 and the DMA buffer 162. At the step S508, the information processing apparatus 200a displays the usable state screen image.

At the step S509, the information processing apparatus 200b receives a beacon transmitted from the AP 300. At the step S510, the information processing apparatus 200b transmits an authentication request for a connection to the wireless network. When an authentication process is normally completed, at the step S511, the information processing apparatus 200b receives a response from the AP 300 to be connected to the wireless network.

At the step S512, the information processing apparatus 200b transmits a state inquiry signal to the image reading apparatus 100. When the image reading apparatus 100 is forwarding image data to the information processing apparatus 200a, at the step S513, the image reading apparatus 100 transmits, to the information processing apparatus 200b, a state indication signal indicating that data is being forwarded. At the step S514, the information processing apparatus 200b displays the non-usable state dialogue. Then, the process is terminated.

Figure 19:
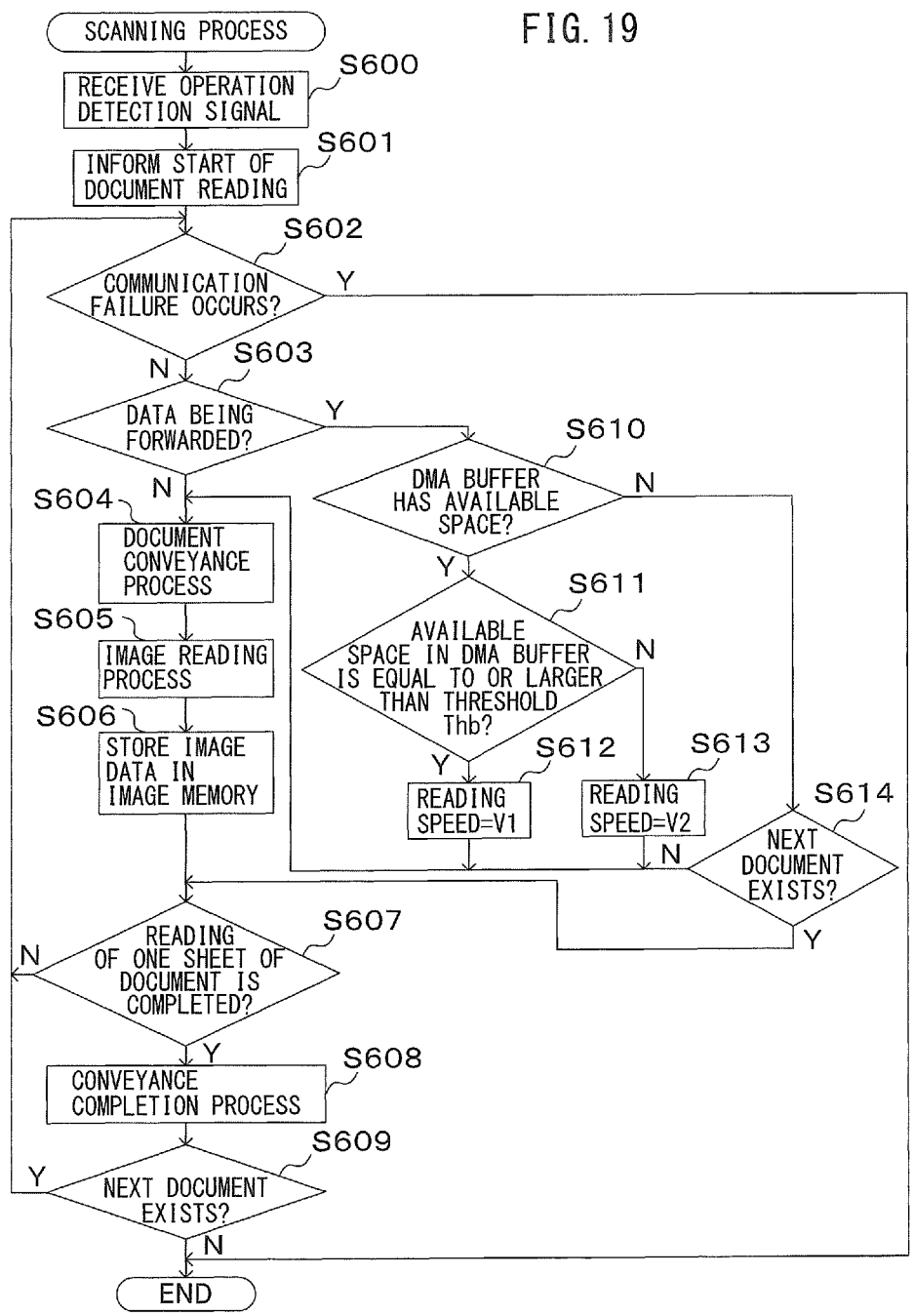
FIG. 19 is a flowchart indicating an example of a scanning process performed by the image reading apparatus 100.

FIG. 19 is a flowchart indicating an example of the scanning process performed by the image reading apparatus 100. When the reading operation control unit 186 in FIG. 6 receives operation detection signal output from the operation button 108 at the step S600, at the step S601, the state informing unit 190 informs the information processing apparatus 200a of a start of document reading.

At the step S602, the communication failure detecting unit 185 determines whether or not an occurrence of a communication failure between the image reading apparatus 100 and the information processing apparatus 200a is detected. When a communication failure occurs (yes at the step S602), the reading operation control unit 186 stops document reading. Then, the scanning process is terminated. When a communication failure does not occur (no at the step S602), the process proceeds to the step S603.

At the step S603, the reading operation control unit 186 determines whether or not image data of a document is being forwarded in the image data forwarding process at the step S103 illustrated in FIG. 14. When image data is being forwarded (yes at the step S603), the process proceeds to the step S610. When image data is not being forwarded (no at the step S603), the process proceeds to the step S604.

At the step S604, the reading operation control unit 186 drives the conveyance mechanism 153 to perform a document conveyance process. At the step S605, the reading unit 171 performs a document reading process. At the step S606, the reading unit 171 stores, in the image memory 151, image data generated by reading the document.

At the step S607, the reading operation control unit 186 determines whether or not reading of one sheet of the document conveyed at the step S604 is completed. When the reading is completed (yes at the step S607), the process proceeds to the step S608. When the reading is not completed (no at the step S607), the process returns to the step S602. At the step S608, the reading operation control unit 186 performs a conveyance completion process on the one sheet of the document conveyed at the step S604. The conveyance completion process causes the document to be discharged to a position on the upper surface cover 106.

At the step S609, the reading operation control unit 186 determines whether or not a next document exists on the document holder 103, on the basis of a first document detecting signal output by the first document detecting unit 114. When a next document exists (yes at the step S609), the process proceeds to the step S602. When a next document does not exist (no at the step S609), the scanning process is terminated.

At the step S610, the reading operation control unit 186 determines whether or not the DMA buffer 162 has an available space. When the DMA buffer has an available space (yes at the step S610), the process proceeds to the step S611. When the DMA buffer does not have any available space (no at the step S610), the process proceeds to the step S614.

At the step S611, the reading operation control unit 186 determines whether or not available capacity of the DMA buffer 162 is equal to or larger than a threshold Thb. If available capacity is equal to or larger than the threshold Thb (yes at the step S611), the process proceeds to the step S612. If available capacity is lower than the threshold Thb (no at the step S611), the process proceeds to the step S613.

At the step S612, the reading operation control unit 186 sets a document reading speed of the image reading apparatus 100 as a relatively high speed V1 (the number of sheets per minute). Subsequently, the process proceeds to the document conveyance process S604, the image reading process S605 . . . and continues. At the step S613, the reading operation control unit 186 sets a document reading speed of the image reading apparatus 100 as a relatively low speed V2 (the number of sheets per minute). Subsequently, the process proceeds to the document conveyance process S604, the image reading process S605, . . . and continues.

At the step S614, the reading operation control unit 186 determines whether or not a next document exists on the document holder 103, on the basis of a first document detecting signal. When a next document does not exist (no at the step S614), subsequently, the process proceeds to the document conveyance process S604, the image reading process S605, . . . and continues. When a next document exists (yes at the step A614), the process proceeds to the step S607. Accordingly, the document conveyance process S604, the image reading process S605, and the image data storing S606 are skipped, so that image reading is temporarily stopped.

Figure 20:
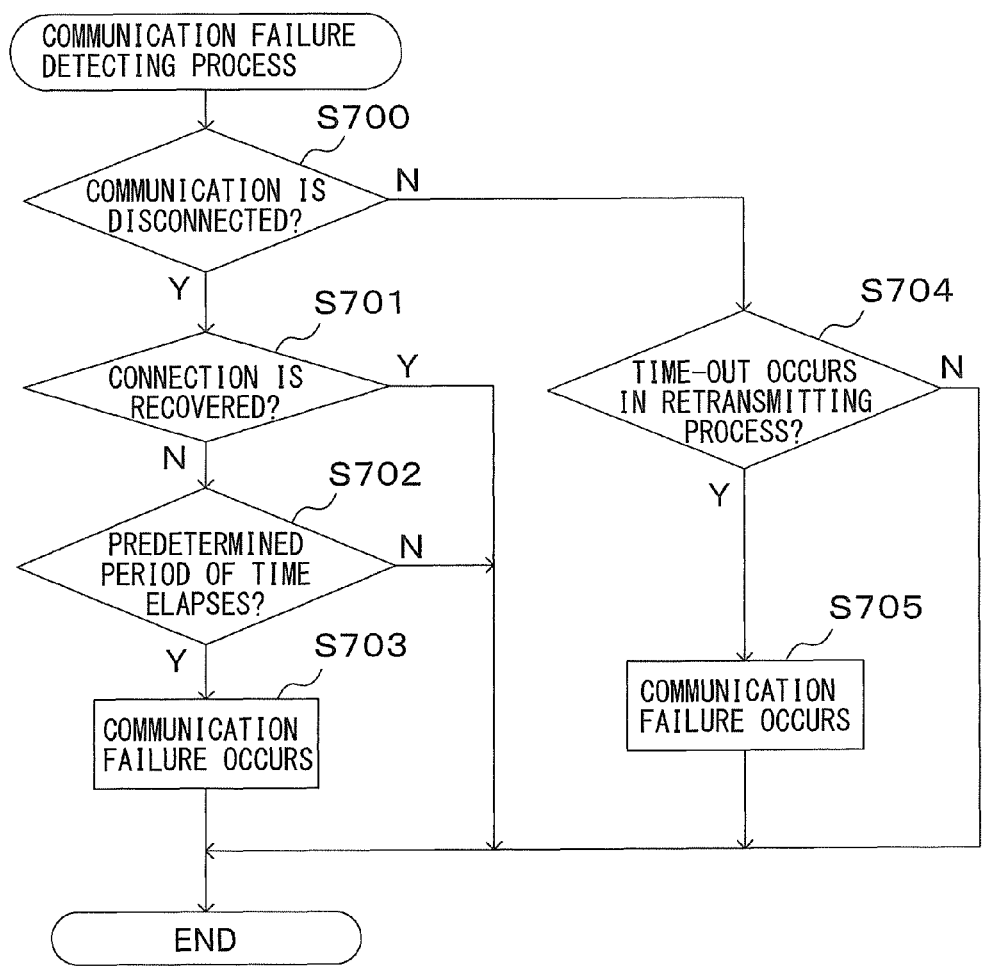
FIG. 20 is a flowchart indicating an example of a communication failure detecting process by a communication failure detecting unit 185.

FIG. 20 is a flowchart indicating an example of a communication failure detecting process by the communication failure detecting unit 185. At the step S700, the communication failure detecting unit 185 in FIG. 6 determines whether or not a communication between the image reading apparatus 100 and the information processing apparatus 200a is disconnected. When the communication is disconnected (yes at the step S700), the process proceeds to the step S701. When the communication is not disconnected (no at the step S700), the process proceeds to the step S704.

At the step S701, the communication failure detecting unit 185 determines whether or not connection between the image reading apparatus 100 and the information processing apparatus 200a is recovered. When connection is recovered (yes at the step S701), the communication failure detecting unit 185 does not detect a communication failure, and terminates the communication failure detecting process. When connection is not recovered (no at the step S701), the process proceeds to the step S702.

At the step S702, the communication failure detecting unit 185 determines whether or not a predetermined period of time elapses after the disconnection. When the predetermined period of time does not elapse (no at the step S702), the communication failure detecting unit 185 does not detect a communication failure, and terminates the communication failure detecting process. When the predetermined period of time elapses (yes at the step S702), the process proceeds to the step S703. At the step S703, the communication failure detecting unit 185 determines that a communication failure between the image reading apparatus 100 and the information processing apparatus 200a occurs. Then, the communication failure detecting process is terminated.

At the step S704, the communication failure detecting unit 185 determines whether or not time-out occurs in an image data retransmitting process by the image data transmitting control unit 183. When time-out occurs (yes at the step S704), the process proceeds to the step S705. When time-out does not occur (no at the step S704), the communication failure detecting unit 185 does not detect a communication failure, and terminates the communication failure detecting process. At the step S705, the communication failure detecting unit 185 determines that a communication failure between the image reading apparatus 100 and the information processing apparatus 200a occurs. Then, the communication failure detecting process is terminated.

Figure 21:
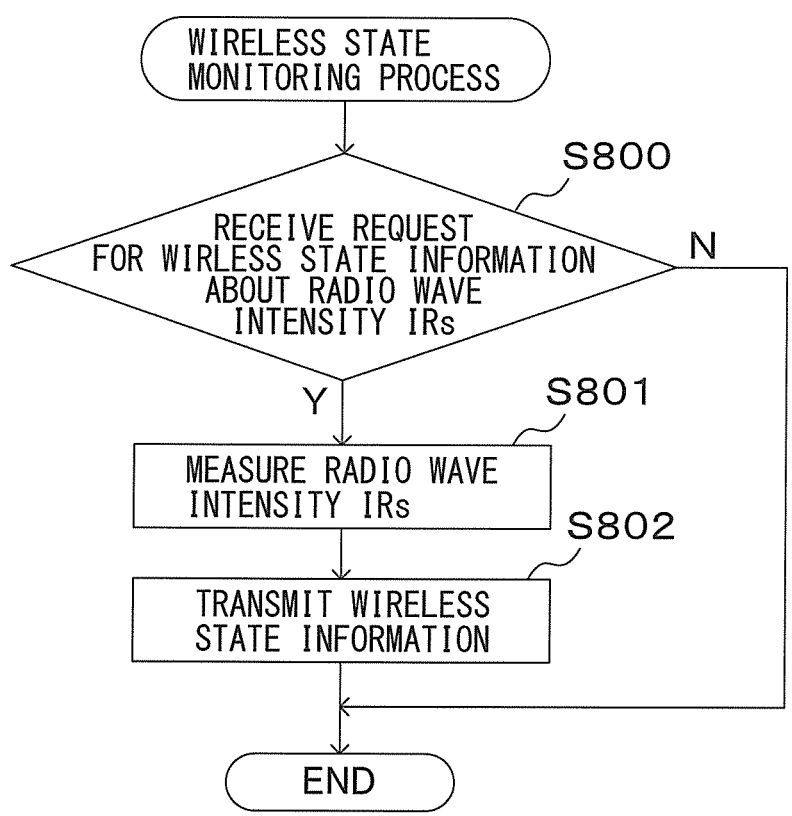
FIG. 21 is a flowchart indicating an example of a wireless state monitoring process by the image reading apparatus 100.

FIG. 21 is a flowchart indicating an example of a wireless state monitoring process by the image reading apparatus 100. At the step S800, the wireless state measuring unit 181 in FIG. 6 determines whether or not the image reading apparatus 100 receives, from the information processing apparatus 200, a request for wireless state information indicating a reception intensity IRs. As described above, the reception intensity IRs is a reception intensity of a wireless signal from the AP 300 at the image reading apparatus 100. When the request is received (yes at the step S800), the process proceeds to the step S801. When the request is not received (no at the step S800), the wireless state monitoring process is terminated.

At the step S801, the wireless state measuring unit 181 measures a reception intensity IRs. At the step S802, the wireless state measuring unit 181 transmits, to information processing apparatus 200, the wireless state information indicating the reception intensity IRs. Then, the wireless state monitoring process is terminated.

Figure 22:
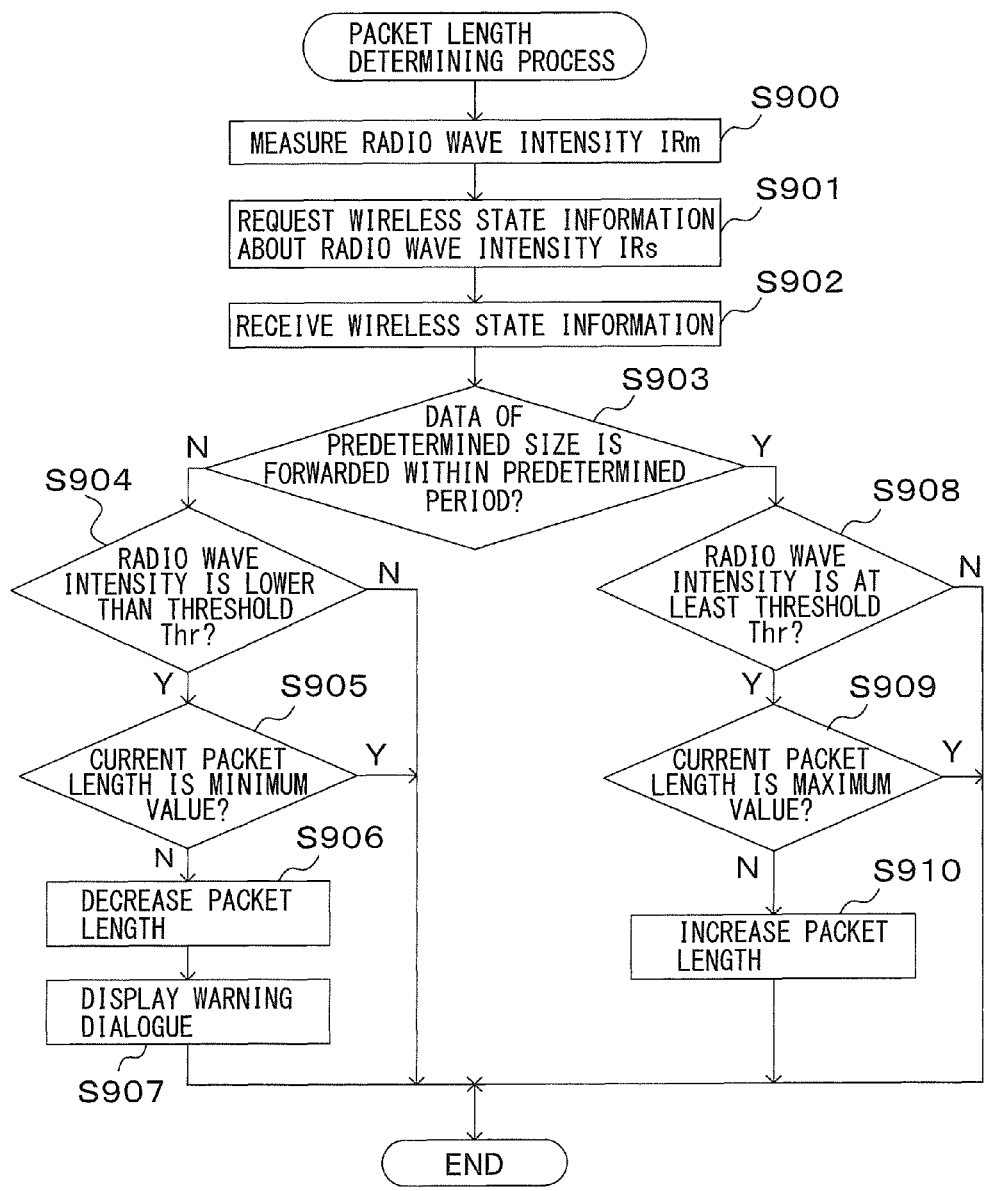

FIG. 22 is a flowchart indicating an example of a packet length determining process by the information processing apparatus 200a. At the step S900, the wireless state measuring unit 223 in FIG. 7 measures a reception intensity IRm of a wireless signal from the AP 300 at the information processing apparatus 200a. At the step S901, the wireless state information obtaining unit 224 requests wireless state information to the image reading apparatus 100. At the step S902, the wireless state information obtaining unit 224 receives wireless state information from the image reading apparatus 100.

At the step S903, the packet length determining unit 225 determines whether or not, when forwarding image data from the image reading apparatus 100 to the information processing apparatus 200, data forwarding of data having a predetermined size is completed within a predetermined period of time. When data forwarding is not completed within the predetermined period of time (no at the step S903), the process proceeds to the step S904. When data forwarding is completed within the predetermined period of time (yes at the step S903), the process proceeds to the step S908.

At the step S904, the packet length determining unit 225 determines whether or not at least one of the reception intensities IRm and IRs is lower than the threshold Thr. When at least one of the reception intensities IRm and IRs is lower than the threshold Thr (yes at the step S904), the process proceeds to the step S905. When both of the reception intensities IRm and IRs are equal to or larger than the threshold Thr (no at the step S904), the packet length determining unit 225 does not change a packet length, and terminates the packet length determining process.

At the step S905, the packet length determining unit 225 determines whether or not a current packet length is the minimum value in a numerical range predetermined as a range of a packet length that can be set. When the current packet length is the minimum value (yes at the step S905), the packet length determining unit 225 does not change the packet length, and terminates the packet length determining process. When the current packet length is not the minimum value (no at the step S905), the process proceeds to the step S906.

At the step S906, the packet length determining unit 225 reduces the packet length. The packet length that has been reduced by the packet length determining unit 225 is informed to the image reading apparatus 100 by packet length information transmitted by the image data receiving control unit 226. At the step S907, the informing control unit 222 causes the output unit 214 to display a warning dialogue. Then, the packet length determining process is terminated.

At the step S908, the packet length determining unit 225 determines whether or not both of the reception intensities IRm and IRs are equal to or larger than the threshold Thr. When both of the reception intensities IRm and IRs are equal to or larger than the threshold Thr (yes at the step S908), the process proceeds to the step S909. When at least one of the reception intensities IRm and IRs is lower than the threshold Thr (no at the step S908), the packet length determining unit 225 does not change a packet length, and terminates the packet length determining process.

At the step S909, the packet length determining unit 225 determines whether or not a current packet length is the maximum value in the numerical range predetermined as the range of a packet length that can be set. When the current packet length is the maximum value (yes at the step S909), the packet length determining unit 225 does not change the packet length, and terminates the packet length determining process. When the current packet length is not the maximum value (no at the step S909), the process proceeds to the step S910.

At the step S910, the packet length determining unit 225 increases the packet length. The packet length that has been increased by the packet length determining unit 225 is informed to the image reading apparatus 100 by packet length information transmitted by the image data receiving control unit 226. Then, the packet length determining process is terminated.

Figure 23:
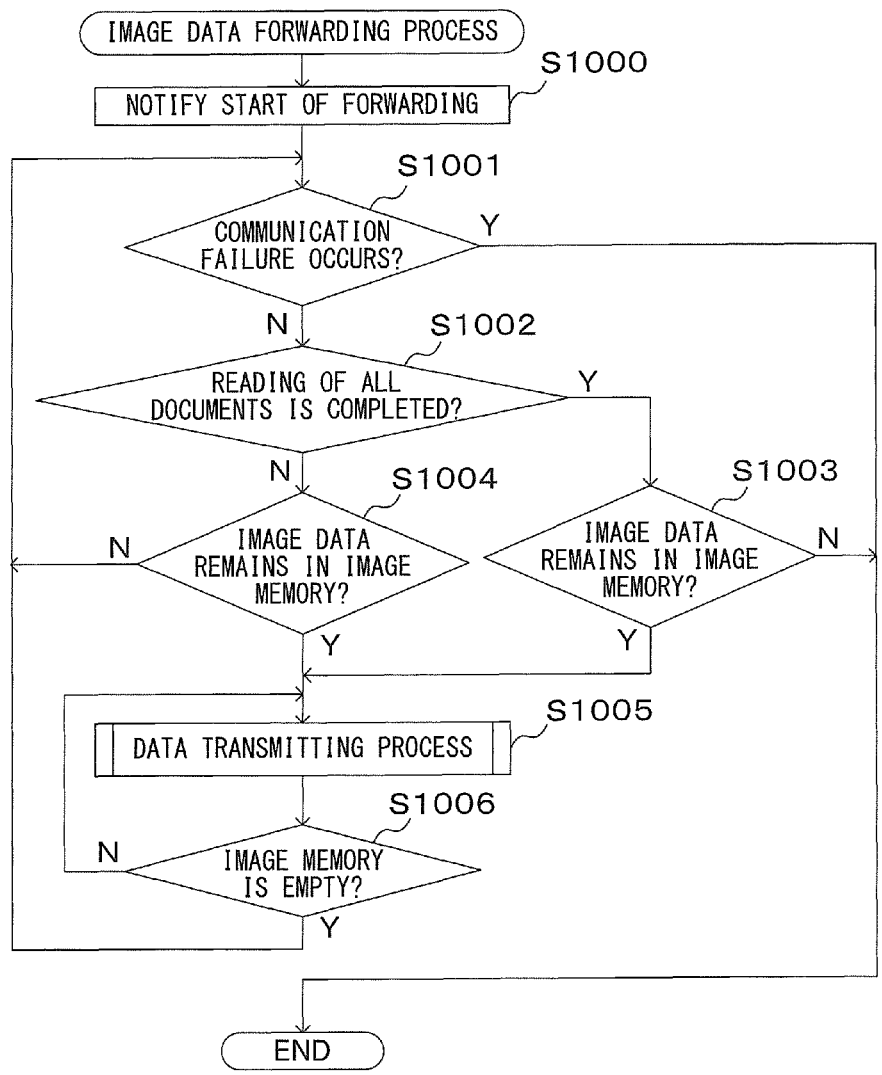
FIG. 23 is a flowchart indicating an example of an image data forwarding process by the image reading apparatus 100.

FIG. 23 is a flowchart indicating an example of an image data forwarding process by the image reading apparatus 100. When forwarding of image data is started, at the step S1000, the state informing unit 190 in FIG. 6 informs the information processing apparatus 200a of a start of image data forwarding.

At the step S1001, the communication failure detecting unit 185 determines whether or not an occurrence of a communication failure between the image reading apparatus 100 and the information processing apparatus 200a is detected.

When a communication failure occurs (yes at the step S1001), the image data transmitting control unit 183 stops the image data forwarding process. When a communication failure does not occur (no at the step S1001), the process proceeds to the step S1002.

At the step S1002, the image data transmitting control unit 183 determines whether or not reading of all the documents is completed in the scanning process 5101 illustrated in FIG. 14. When reading of all the documents is completed (yes at the step S1002), the process proceeds to the step S1003. When any documents are remaining to be read (no at the step S1002), the process proceeds to the step S1004.

At the step S1003, the image data transmitting control unit 183 determines whether or not image data is remaining to be transmitted in the image memory 151. When image data is remaining to be transmitted (yes at the step S1003), the process proceeds to the step S1005. When no image data is remaining (no at the step S1003), the image data forwarding process is terminated.

At the step S1004, the image data transmitting control unit 183 determines whether or not image data is remaining to be transmitted in the image memory 151. When image data is remaining to be transmitted (yes at the step S1004), the process proceeds to the step S1005. When no image data remaining (no at the step S1004), the process returns to the process S1001.

At the step S1005, the image data transmitting control unit 183 performs a data transmitting process of transmitting, to the information processing apparatus 200a, image data forwarded from the image memory 151 to the DMA buffer 162. At the step S1006, the image data transmitting control unit 183 determines whether or not the image memory 151 is empty. If the image memory 151 is empty (yes at the step S1006), the process returns to the S1001. When the image memory 151 is not empty (no at the step S1006), the process returns to the S1005.

Figure 24:
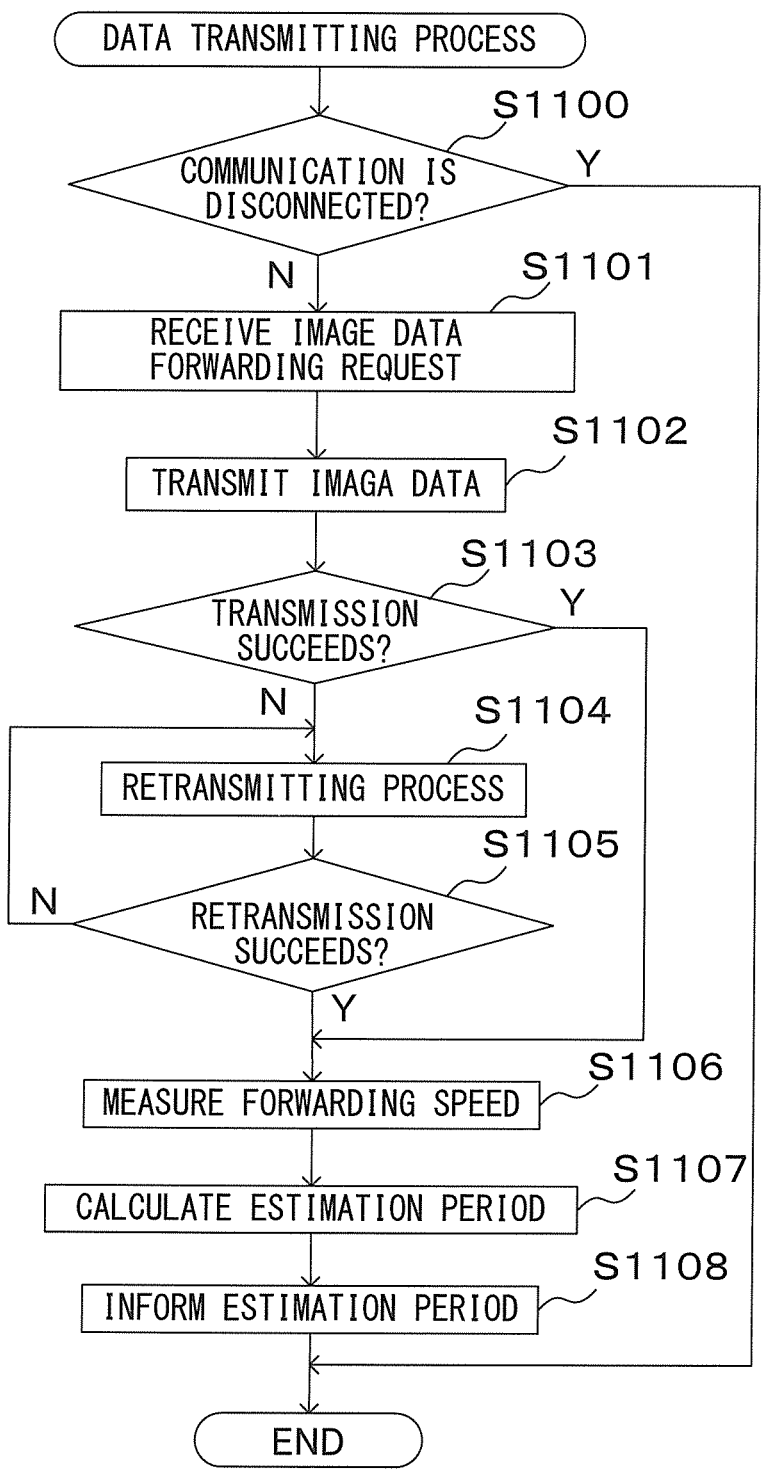
FIG. 24 is a flowchart indicating an example of a data transmitting process in FIG. 23.

FIG. 24 is a flowchart indicating an example of the data transmitting process in FIG. 23. At the step S1100, the image data transmitting control unit 183 in FIG. 6 determines whether or not the communication failure detecting unit 185 detects disconnection of communication between the image reading apparatus 100 and the information processing apparatus 200. When disconnection is detected (yes at the step S1100), the image data transmitting control unit 183 stops the data transmitting process. Thereby, the image data transmitting control unit 183 temporarily halt transmission of image data. When disconnection is not detected (no at the step S1100), the process proceeds to the step S1101.

At the step S1101, the image data transmitting control unit 183 receives an image data forwarding request from the information processing apparatus 200. At the step S1102, the image data transmitting control unit 183 causes the image data transmitting unit 184 to store, in packets, image data held in the DMA buffer 162, and to transmit the packets to the information processing apparatus 200a. At this time, the image data transmitting control unit 183 adjusts a packet length of the packets so as to become a length specified by packet length information included in the image data forwarding request.

At the step S1103, the image data transmitting control unit 183 determines whether or not transmission of the packets succeeds. When transmission succeeds (yes at the step S1103), the process proceeds to the step S1106. When transmission fails (no at the step S1103), the process proceeds to the step S1104.

At the step S1104, the image data transmitting control unit 183 performs a process of retransmitting packets that have failed in transmission. At the step S1105, the image data transmitting control unit 183 determines whether or not retransmission of the packets succeeds. When retransmission of the packets succeeds (yes at the step S1105), the process proceeds to the step S1106. When retransmission of the packets fails (no at the step S1105), the process returns to the step S1104.

At the step S1106, the forwarding speed measuring unit 187 measures a speed at which the image data transmitting unit 184 forwards image data. At the step S1107, the estimation period calculating unit 188 calculates an estimated period up to the time when forwarding of image data remaining in the DMA buffer 162 is completed. At the step S1108, the estimation period informing unit 189 informs the image processing apparatus 200 of the estimated period. Then, the data transmitting process is terminated.

Figure 25:
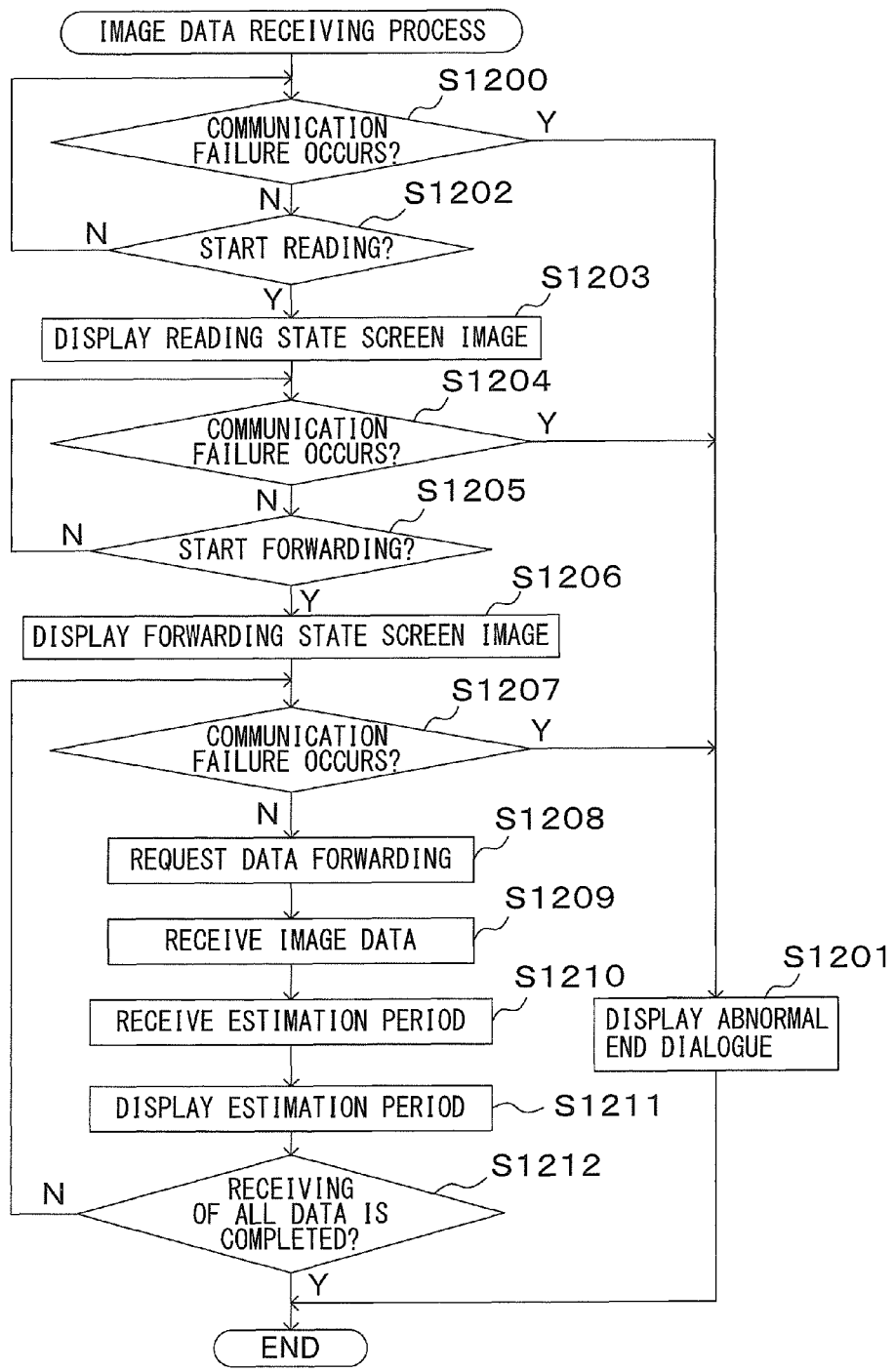

FIG. 25 is a flowchart indicating an example of an image data receiving process by the information processing apparatus 200a. At the step S1200, the communication failure detecting unit 228 in FIG. 7 determines whether or not an occurrence of a communication failure between the image reading apparatus 100 and the information processing apparatus 200a is detected. When a communication failure occurs (yes at the step S1200), the process proceeds to the step S1201. When a communication failure does not occur (no at the step S1200), the process proceeds to the step S1202. At the step S1201, the informing control unit 222 causes the output unit 214 to display an abnormal end dialogue. Then, the image data receiving process is terminated.

At the step S1202, the informing control unit 222 determines whether or not a start of document reading is informed by the image reading apparatus 100. When the start of document reading is informed, the process proceeds to the step S1203. When the start of document reading is not informed, the process returns to the step S1200. At the step S1203, the informing control unit 222 causes the output unit 214 to display a reading state screen image. Then, the process proceeds to the step S1204.

At the step S1204, the communication failure detecting unit 228 determines whether or not an occurrence of a communication failure between the image reading apparatus 100 and the information processing apparatus 200a is detected. When a communication failure occurs (yes at the step S1204), the process proceeds to the step S1201. When a communication failure does not occur (no at the step S1204), the process proceeds to the step S1205.

At the step S1205, the informing control unit 222 determines whether or not a start of image data forwarding is informed by the image reading apparatus 100. When the start of forwarding is informed, the process proceeds to the step S1206. When the start of forwarding is not informed, the process returns to the step S1204. At the step S1206, the informing control unit 222 causes the output unit 214 to display a forwarding state screen image. Then, the process proceeds to the step S1207.

At the step S1207, the communication failure detecting unit 228 determines whether or not an occurrence of a communication failure between the image reading apparatus 100 and the information processing apparatus 200a is detected. When a communication failure occurs (yes at the step S1207), the process proceeds to the step S1201. When a communication failure does not occur (no at the step S1207), the process proceeds to the step S1208.

At the step S1208, the image data receiving control unit 226 transmits an image data forwarding request to the image reading apparatus 100. At the step S1209, the image data receiving control unit 226 causes the image data receiving unit 227 to receive image data.

At the step S1210, the informing control unit 222 receives, from the image reading apparatus 100, a notification about an estimated period up to the time when forwarding of the image data is completed. At the step S1211, the informing control unit 222 causes the output unit 214 to display the estimated period notified by the image reading apparatus 100. At the step S1212, the image data receiving control unit 226 determines whether or not receiving of all the image data is completed. When receiving is completed (yes at the step S1212), the image data receiving process is terminated. When receiving is not completed (no at the step S1212), the process returns to the step S1207.

Figure 26:
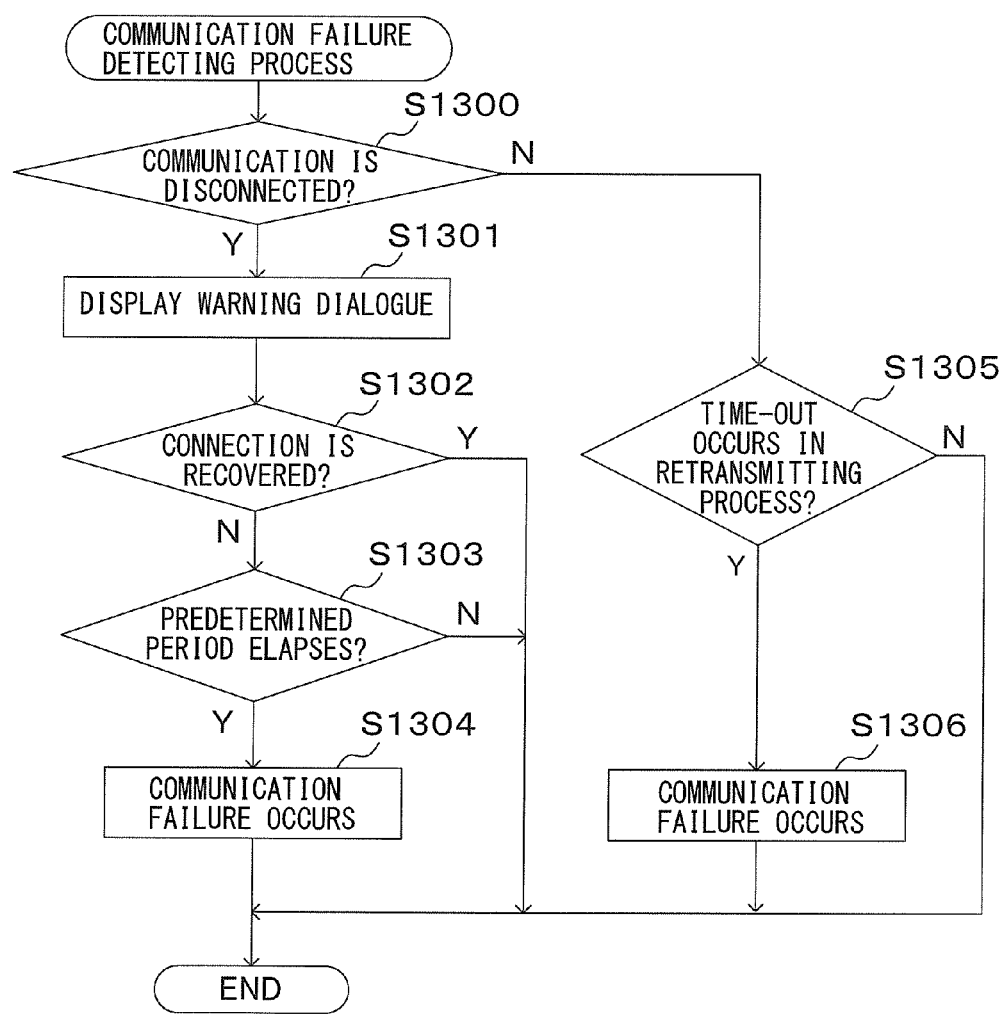
FIG. 26 is a flowchart indicating an example of a communication failure detecting process by a communication failure detecting unit 228.

FIG. 26 is a flowchart indicating an example of a communication failure detecting process by the communication failure detecting unit 228. At the step S1300, the communication failure detecting unit 228 in FIG. 7 determines whether or not communication between the image reading apparatus 100 and the information processing apparatus 200a is disconnected. When communication is disconnected (yes at the step S1300), the process proceeds to the step S1301. When communication is not disconnected (no at the step S1300), the process proceeds to the step S1305.

At the step S1301, the informing control unit 222 causes the output unit 214 to display a warning dialogue. At the step S1302, the communication failure detecting unit 228 determines whether or not a connection between the image reading apparatus 100 and the information processing apparatus 200a is recovered. When connection is recovered (yes at the step S1302), the communication failure detecting unit 228 does not detect a communication failure, and terminates the communication failure detecting process. When connection is not recovered (no at the step S1302), the process proceeds to the step S1303.

At the step S1303, the informing control unit 222 determines whether or not a predetermined period of time elapses after the disconnection. When the predetermined period of time does not elapse (no at the step S1303), the communication failure detecting unit 228 does not detect a communication failure, and terminates the communication failure detecting process. When the predetermined period of time elapses (yes at the step S1303), the process proceeds to the step S1304. At the step S1304, the communication failure detecting unit 228 determines that a communication failure between the image reading apparatus 100 and the information processing apparatus 200a occurs. Then, the communication failure detecting process is terminated.

At the step S1305, the communication failure detecting unit 228 determines whether or not time-out occurs in a retransmitting process for a process of transmitting image data from the image reading apparatus 100. When time-out occurs (yes at the step S1305), the process proceeds to the step S1306. When time-out does not occur (no at the step S1305), the communication failure detecting unit 228 does not detect a communication failure, and terminates the communication failure detecting process. At the step S1306, the communication failure detecting unit 228 determines that a communication failure between the image reading apparatus 100 and the information processing apparatus 200a occurs. Then, the communication failure detecting process is terminated.

FIG. 27 illustrates an example of a signal sequence at the time of forwarding image data. At the step S1400, the information processing apparatus 200a receives a wireless signal from the AP 300. At the step S1401, the information processing apparatus 200a measures reception intensity IRm of the wireless signal.

At the step S1402, the information processing apparatus 200a requests wireless state information to the image reading apparatus 100. At the step S1403, the image reading apparatus 100 receives a wireless signal from the AP 300. At the step S1404, the image reading apparatus 100 measures a reception intensity IRs of the wireless signal. At the step S1405, the image reading apparatus 100 transmits, to the information processing apparatus 200a, wireless state information indicating the reception intensity IRs.

At the step S1406, on the basis of the reception intensities IRm and IRs, the information processing apparatus 200a determines a packet length of packets that carries image data from the image reading apparatus 100 to the information processing apparatus 200a. When a packet length is reduced, at the step S1407, the information processing apparatus 200a displays a warning dialogue.

At the step S1408, the information processing apparatus 200a transmits an image data forwarding request to the image reading apparatus 100. The image data forwarding request includes packet length information specifying the packet length determined by the information processing apparatus 200a. At the step S1409, the image reading apparatus 100 stores image data in packets with the packet length specified by the packet length information, and transmits the packets to the information processing apparatus 200a.

At the step S1410, the image reading apparatus 100 informs the information processing apparatus 200a of an estimated period up to the time when forwarding of the image data is completed. At the step S1411, the information processing apparatus 200a displays the estimated period.

According to the present embodiment, in response to degradation in a wireless state between the image reading apparatus 100 and the AP 300 or between the information processing apparatus 200 and the AP 300, a packet length of packets carrying image data is reduced. As a result, it is possible to suppress increase in the number of times packet retransmission is performed, this increase being caused by degradation in the wireless state. Accordingly, delay in image data forwarding can be suppressed.

A speed of data forwarding between the image reading apparatus 100 and the information processing apparatus 200 is affected also by a wireless state between the image reading apparatus 100 and the AP 300. For this reason, according to the present embodiment, information of a wireless state between the image reading apparatus 100 and the AP 300 is transmitted from the image reading apparatus 100 to the information processing apparatus 200. As a result, the information processing apparatus 200 can change a packet length in accordance with a wireless state between the image reading apparatus 100 and the AP 300, this wireless state being unable to be measured by the information processing apparatus 200.

According to the present embodiment, depending on an available capacity of the DMA buffer 162, a reading speed of the image reading apparatus 100 is changed, or reading is stopped. For this reason, according to the present embodiment, behavior change in reading operation enables a user to know delay in image data forwarding, this delay being caused by degradation in a wireless state.

According to the present embodiment, when a wireless state between the image reading apparatus 100 and the AP 300 or between the information processing apparatus 200 and the AP 300 is degraded, and a data forwarding speed is thereby lowered, the information processing apparatus 200 displays the warning dialogue. Accordingly, a user can prevent a data forwarding failure caused by a careless movement.

According to the present embodiment, when the information processing apparatus 200 other than the apparatus to which image data was forwarded at the last reading time makes connection to the image reading apparatus 100, data in the image memory 151 and the DMA buffer 162 is deleted. Accordingly, image data that was not forwarded at the last reading time is prevented from being mistakenly forwarded to the information processing apparatus 200 of a different user.

An estimated period up to data forwarding completion is displayed to be able to improve convenience for a user. For example, when an estimated period is short, a user can decide to leave the information processing apparatus 200 on the spot, and do other work. Further, a user is able to know indirectly that forwarding of image data is delayed due to degradation in a wireless state.

According to the present embodiment, while data is being forwarded to the information processing apparatus 200*a*, the non-usable state dialogue is displayed for the different information processing apparatus 200*b* that tries to make connection to the image reading apparatus 100. Accordingly, a user who tries to use the image reading apparatus 100 is able to know that the image reading apparatus 100 is currently unavailable, even if the user does not approach the image reading apparatus 100. Further, the informing unit 127 can display that the image reading apparatus 100 is being used. Thereby, even if the image reading apparatus 100 is not conveying a document, it is possible to inform that the image reading apparatus 100 is being used.

The apparatus, system and computer readable medium disclosed in this specification have at least one of the following effect.

(1) Delay in data forwarding is reduced, the delay occurring when quality in wireless communication between the image reading apparatus and the information processing apparatus is degraded.

(2) A state of the image reading apparatus is informed in a more easily recognizable manner to a plurality of users sharing the image reading apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image reading system comprising:
an information processing apparatus; and
an image reading apparatus communicating with the information processing apparatus via a wireless network,
wherein the information processing apparatus includes:
a wireless state detector for detecting a first wireless state between the information processing apparatus and an access point in the wireless network;
a wireless state information receiver for receiving, from the image reading apparatus, information of a second wireless state between the image reading apparatus and the access point in the wireless network;
a packet length determining module for determining a packet length such that the packet length in forwarding image data obtained by reading a document by the image reading apparatus to the information processing apparatus via the wireless network is reduced according to a degradation in either one of the first wireless state and the second wireless state; and
a packet length information transmitter for transmitting, to the image reading apparatus, packet length information corresponding to the determined packet length.

2. The image reading system according to claim 1, wherein the image reading apparatus comprises:
a reader for reading the document to generate the image data;
a wireless state detector for detecting the second wireless state between the image reading apparatus and the access point in the wireless network;
a wireless state information transmitter for transmitting the information of the second wireless state to the information processing apparatus;
a packet length information receiver for receiving the packet length information from the information processing apparatus; and
an image data transmitter for storing the image data in packets with the packet length corresponding to the packet length information and transmitting the packets to the information processing apparatus via the wireless network.

3. The image reading system according to claim 2, wherein the image reading apparatus further comprises:
an image memory for storing the image data generated by the reader;
a buffer memory for storing the image data that is read out from the image memory and that is to be transmitted by the image data transmitter; and
a reading speed control module for decreasing a speed at which the reader reads the document, in accordance with a decrease in an available capacity of the buffer memory.

4. The image reading system according to claim 3, wherein the image reading apparatus further comprises a processor for performing a connecting process of a connection between the image reading apparatus and the information processing apparatus, and for deleting the image data stored in the image memory and the buffer memory when another information processing apparatus different from the information processing apparatus to which the image data was forwarded last time is connected to the image reading apparatus.

5. The image reading system according to claim 1, wherein the image reading apparatus comprises:
a forwarding speed detector for detecting a speed of forwarding data to the information processing apparatus;
an estimation period calculator for calculating an estimated period up to completion of the forwarding of the image data stored in a buffer memory, in accordance with the speed of forwarding data; and
an estimation period transmitter for transmitting a notification of the estimated period to the information processing apparatus.

6. The image reading system according to claim 1, wherein the image reading apparatus comprises a generator for outputting different instructions depending on whether the image reading apparatus is forwarding the image data to the information processing apparatus.

7. The image reading system according to claim 1, wherein the image reading apparatus comprises a transmitter for transmitting, in responding to a first signal received from a first information processing apparatus, to the first information processing apparatus, a second signal specified depending on whether the image reading apparatus is forwarding the image data to a second information processing apparatus different from the first information processing apparatus, and wherein the information processing apparatus further comprises a generator for outputting an instruction in accordance with the second signal received from the image reading apparatus.

8. The image reading system according to claim 1, wherein the information processing apparatus further comprises an alarm generator for outputting an alarm in accordance with the degradation in either one of the first wireless state and the second wireless state.

9. An information processing apparatus comprising:
a wireless state detector for detecting a first wireless state between the information processing apparatus and an access point in a wireless network;
a wireless state information receiver for receiving, from an image reading apparatus, information of a second wireless state between the image reading apparatus and the access point in the wireless network;
a packet length determining module for determining a packet length such that the packet length in forwarding image data obtained by reading a document by the image reading apparatus to the information processing apparatus via the wireless network is reduced according to a degradation in either one of the first wireless state and the second wireless state; and
a packet length information transmitter for transmitting, to the image reading apparatus, packet length information corresponding to the determined packet length.

10. An image reading apparatus comprising:
a reader for reading a document to generate image data;
a wireless state detector for detecting a wireless state between the image reading apparatus and an access point in a wireless network;
a wireless state information transmitter for transmitting information of the wireless state to an information processing apparatus;
a packet length information receiver for receiving, from the information processing apparatus, packet length information of a packet length determined by the information processing apparatus in accordance with the wireless state in forwarding the image data to the information processing apparatus via the wireless network; and
an image data transmitter for storing the image data in packets with the packet length corresponding to the packet length information and transmitting the packets to the information processing apparatus via the wireless network.

11. A non-transitory computer-readable medium storing a computer program for causing a computer to execute a process, the process comprising:
detecting a first wireless state between the computer and an access point in a wireless network;
receiving, from an image reading apparatus, information of a second wireless state between the image reading apparatus and the access point in the wireless network;
determining a packet length such that the packet length in forwarding image data obtained by reading a document by the image reading apparatus to the computer via the wireless network is reduced according to a degradation in either one of the first wireless state and the second wireless state; and
transmitting, to the image reading apparatus, packet length information corresponding to the determined packet length.

* * * * *